US007702652B2

(12) United States Patent
Twig et al.

(10) Patent No.: US 7,702,652 B2
(45) Date of Patent: *Apr. 20, 2010

(54) METHOD AND SYSTEM FOR PRESENTING ON-LINE "YELLOW PAGES", PARTICULARLY IN ASSOCIATION WITH LOCATION DATA

(76) Inventors: Ilan Twig, 26 Degel Reuven Street, Petah Tikva, I (IL); Amit Arad, 10 Gonen Street, Tel Aviv (IL)

( * ) Notice: Subject to any disclaimer, the term of this patent is extended or adjusted under 35 U.S.C. 154(b) by 555 days.

This patent is subject to a terminal disclaimer.

(21) Appl. No.: 10/734,159

(22) Filed: Dec. 15, 2003

(65) Prior Publication Data
US 2004/0176974 A1 Sep. 9, 2004

Related U.S. Application Data

(63) Continuation of application No. 09/855,751, filed on May 16, 2001, now Pat. No. 6,665,676.

(51) Int. Cl.
*G06F 7/00* (2006.01)
*G06F 17/00* (2006.01)
*G06F 3/00* (2006.01)
(52) U.S. Cl. ............. 707/104.1; 707/101; 715/712
(58) Field of Classification Search ............. 707/3, 707/10; 715/738, 810, 855; 705/26, 14; 701/120, 201, 207, 209; 434/130
See application file for complete search history.

(56) References Cited

U.S. PATENT DOCUMENTS

| 5,724,521 | A | * | 3/1998 | Dedrick ............... 705/26 |
| 5,948,040 | A | * | 9/1999 | DeLorme et al. ...... 701/201 |
| 5,966,135 | A | | 10/1999 | Roy et al. |
| 6,205,441 | B1 | | 3/2001 | Al-Omari et al. |
| 6,480,885 | B1 | * | 11/2002 | Olivier ............... 709/207 |
| 6,493,710 | B1 | | 12/2002 | Gollapudi et al. |

(Continued)

OTHER PUBLICATIONS

Kim et al., The load monitoring of Web server using mobile agent, Info-tech and Info-net, 2001, Proceedings, ICII 2001-Beijing 001, International Conferences on, vol. 5, 2001, pp. 89-94, vol. 5.

(Continued)

*Primary Examiner*—Apu M Mofiz
*Assistant Examiner*—Susan Y Chen
(74) *Attorney, Agent, or Firm*—Woodcock Washburn LLP

(57) ABSTRACT

A method for doing business, wherein a web server maintains a commercial subscriber database including a plurality of records each containing data relating to commercial subscribers including at least name, address and category, and imposes a periodic subscription fee on at least some of the commercial subscribers. On receiving from a client machine connected thereto a request to download data relating to at least one specified category of commercial subscriber, it extracts from the commercial subscriber database respective records and sends to the client machine for display thereby, allows receipt of an update from one or more commercial subscribers in respect of substitute or supplementary data to that contained in the respective database record of the commercial subscribers, and updates the commercial subscriber database as required.

34 Claims, 15 Drawing Sheets

U.S. PATENT DOCUMENTS

| | | |
|---|---|---|
| 6,546,334 B1 | 4/2003 | Fukuchi et al. |
| 6,577,714 B1 | 6/2003 | Darcie et al. |
| 6,665,676 B2 | 12/2003 | Twig et al. |
| 6,735,585 B1 * | 5/2004 | Black et al. .................... 707/3 |
| 6,807,558 B1 * | 10/2004 | Hassett et al. ............... 709/203 |
| 6,868,525 B1 * | 3/2005 | Szabo ........................ 715/738 |
| 7,089,507 B2 * | 8/2006 | Lection et al. .............. 715/855 |
| 2002/0035611 A1 * | 3/2002 | Dooley ....................... 709/218 |
| 2002/0046104 A1 * | 4/2002 | Kaddeche et al. ............ 705/14 |
| 2005/0165766 A1 * | 7/2005 | Szabo ............................ 707/3 |

OTHER PUBLICATIONS

Cardellini et al., Efficient state estimators for load control policies in scalable Web server clusters, Computer Software and Applications Conference, 1998, COMPSAC '98, Proceedings, The Twenty-Second Annual International, Aug. 19-21, 1998, pp. 449-455.

Feinberg, et al., Applying cognitive load theory to the design of Web-based Instruction, IPCC/SIGDOC 2000, Proceedings, Technology & Teamwork, 2000, pp. 535-360.

* cited by examiner

METHOD AND SYSTEM FOR PRESENTING ON-LINE "YELLOW PAGES", PARTICULARLY IN ASSOCIATION WITH LOCATION DATA

CROSS-REFERENCE TO RELATED APPLICATION

This is a continuation of U.S. application Ser. No. 09/855,751, filed May 16, 2001, now U.S. Pat. No. 6,665,676, the entire disclosure of which is hereby incorporated by reference, which in turn claims priority of Israeli application 136233, filed May 18, 2000.

FIELD OF THE INVENTION

This invention relates to transferring data over a low bandwidth network. More particularly, this invention relates to rapid transfer of large map-images in a slow network connection.

BACKGROUND OF THE INVENTION

When using the Internet, the time it takes for a web page to be loaded in the user's remote machine is highly critical. The maximum reasonable waiting time is defined to be a matter of seconds (not more than a dozen or two). Common map-transfer methods are based on a process in which the client requests a portion of the map, the server executes the request using a special engine that can dynamically create the desired portion of the map, and the result is sent to the client as an image file (gif, jpeg . . . ). This process is slow and limited, as the size of the resulting image is limited to a few KBytes (not more than several dozen). In addition, any navigation request (including zooming) requires a new 'dialog' with the host server, and a new waiting time for the updated result-image.

When designing a web site, there must be a correlation between the size (in KB—kilobytes) of the elements that it contains (images, sound, animations, special scripts and also the textual information) and the quality of the network connection. It makes no sense to include high-volume elements when the connection is poor and slow. Adapting the size of the web page to the quality of the network is essential in order to achieve a site that can be viewed without having a long waiting time.

Considering the following facts:

A Standard modem connection data-transfer-rate is about 3 KB/s (3 kilobytes per second)

A low detailed image comprising 4 bit color, and 400×400 pixels occupies about 100 Kb (100 kilo bytes)

A standard screen resolution is 800×600 (pixels)

Downloading a 400×400 (pixels) low detailed image, through a standard Internet modem connection takes as long as 30 seconds. A 400×400 (pixels) image is a relatively large image. It takes about 66% of the size of a standard screen. Most web sites usually contain reduced weight images (like small banners, logos or icons). Those images occupy only a few Kb (maybe a dozen), and so appear sufficiently fast on the client side so that the end user does not wait too long (typically only several seconds).

In other words, as long as a site does not contain large images, it may be viewed relatively fast by the end user (client). The current standard bandwidth (about 3 Kb/s) is fast enough to permit fairly free use of banners, icons, logos and more, on web sites without requiring the end user to wait too long.

However, this breaks down when it is desired to download much larger images from a web site. For example, an image containing 400×4000 pixels, which is ten times larger than in the previous example, would probably occupy about 1000 KB, and it would take around 5 minutes to download. It cannot reasonably expected that most users will wait so long and for this reason, most sites do not contain such large images.

This problem is particularly acute in sites that contain maps. Maps are large and highly detailed pictures. Compressing a map is not so efficient owing to the importance of almost every pixel in the picture. A mono-chrome GIF image of a low detailed street map of Tel-Aviv would occupy about 1000 Kb and would take some five minutes to download, as explained above.

In order to use large images over the Internet using current methods, either an improved compression algorithm or an extremely high bandwidth connection is required, or both. Neither solution is immediately apparent.

Some attempt has been made to address the need to allow fast data transfer of map data from a server to a client. For example, U.S. Pat. No. 5,966,135 assigned to Autodesk, Inc. of San Rafael, Calif., discloses a method, apparatus, and article of manufacture for a computer implemented geographic information system that enables viewing a map picture that is generated from vector-based data. Map pictures can be generated with vector-based data. Map pictures comprising map objects, such as states and cities created with vector-based data can be viewed. Map objects can be chosen to obtain additional information, for example, a different map picture. Additionally, areas of the map picture can be zoomed in on to view the areas with greater resolution or to obtain additional data about the areas. Furthermore, when a user requests to view a map picture, only the map data required to respond to the user's request is downloaded to generate a map picture. As a user makes additional requests for information, additional map data is downloaded and new map pictures are generated.

The map data may be layered so that only those layers actually requested by a user need be downloaded thereto, thus saving communication time. It appears that whilst manipulation of the map displayed on the client terminal may be effected, in most cases the actual processing of the map data is done by the map server, which generates and sends fresh map data to the client for display thereby. During the resulting hiatus, a message is presented so as to inform the user that a dynamic map is being processed. Specifically, this processing requires the transmission of complete map data relating to the newly-requested map to the client for display thereby. That this is so derives from the fact that, as noted above, when a user requests to view a map picture, only the map data required to respond to the user's request is downloaded to generate a map picture. As a user makes additional requests for information, the map data corresponding to the newly-requested map is downloaded from the map server and new map pictures are generated. Thus, after downloading an initial map, if the user wishes to view a location which is current not displayed (i.e. off screen), the displayed image can be panned left, right, up or down using navigation keys. When this is done, a request is sent to the map server, which processes the request, during which time a message is presented so as to inform the user that a dynamic map is being processed.

Likewise, the user can define a window within the displayed map area that he or she would like to see enlarged. This type of manipulation is referred to generally as "zooming" but it is important to appreciate that, in fact, two quite different manipulations may be performed. Thus, zooming can be used to increase the resolution at which graphical data is viewed in the computer display screen. Consider, for example, that a user wants to see a street map of New York City and that initially this is the only information the program knows. In this case, a complete map of New York city is downloaded to the user. Clearly, even ignoring considerations of bulk data transfer, communication bandwidth, and so on, the amount of data that can be resolved on the display screen is limited. At best, all that can be seen in a large scale map covering such a large area, are the main arteries possibly including minimal textual data. Any attempt to display more data would result either in the data been miniscule or in one set data obliterating another. In either case, since the data would in any case be illegible, it is not transferred in the initial display. This, of course, accelerates the rate at which the initial map data can be transferred from the map server to the user.

If the user now marks a relatively small area of the complete city map containing a region of interest, then since data is to be displayed at greatly increased scale (i.e. covering a much reduced area), much more data can now be displayed. This data must first be extracted from the map server, and of course, this is accompanied by the usual hiatus and informative message to the user. If the user, zooms in even more, this process is repeated until eventually there comes a point when the extracted map data relates to so small an area, that all the map data relating to this area can be displayed. If the user zooms in even further at this stage, all that can be done is to display the same map data at magnified scale. Thus, the width of streets will become larger as will the size of any descriptive text relating thereto. In this one, specific instance, since no more map data is available for the selected area, there is no requirement to extract different map data from the map server. The response time for displaying the identical map data at higher magnification is therefore almost immediate since only local processing of the locally stored data is required.

Thus, a distinction must be made between that "zooming" which allows for map data to be shown at higher resolution and that "zooming" which merely displays at enlarged scale (but the same resolution) the same map data. In the first case, more map data than was previously displayed must be shown and this must first be extracted from the map server in order to be available to the map viewer on the user's machine.

The principal saving in communication time appears therefore to reside in the fact that the map data is stored in compressed vector format.

It would therefore be desirable to propose an alternative approach to downloading large map-images, allowing large maps to be downloaded quickly in a low bandwidth connection from a web site to a client machine, whilst also allowing manipulation of the map data by the client without requiring that the map data be re-processed by the web site.

SUMMARY OF THE INVENTION

This requirement is met by a first aspect of the invention by a method for downloading map data from a map server to a client machine connected to the map server, said method comprising the following steps all carried out by the map server:
  (a) storing a database of map data relating to a map,
  (b) receiving from the client machine a request to download a map of a geographical region forming at least part of the map, and
  (a) downloading sufficient map data to the client machine to allow an operator of the client machine to navigate within said geographical region without requiring new map data to be downloaded from the map server.

According to a preferred embodiment, there are stored in the database discrete layers of map data each including geometrical entities associated with a map in minimized vector format and/or descriptive information in text format relating to said geometrical entities. A layer of map data is extracted from the database corresponding to the requested geographical region of the map and downloaded to the client machine. Further layers are extracted and downloaded as required so as to allow progressively more detail to be cached and displayed by the client machine.

In accordance with a second aspect of the invention there is provided a method for downloading and rendering map data from a map server, said method comprising the following steps all carried out by a client machine connected to the map server:
  (a) sending to the map server a request to download a geographical region forming at least part of a map from the map server storing map data in a database thereof,
  (b) downloading and caching map data from the map server,
  (c) displaying at least part of the map data on a display device of the client machine, and
  (d) allowing input of navigation commands and responding thereto by displaying different parts of the map data as required without downloading new map data from the map server.

In accordance with a third aspect of the invention there is provided a method for downloading from a web server to a client machine data including a static base component and a dynamic auxiliary component, said method comprising the following steps all carried out by the web server:
  (a) downloading the static base component to the client machine for storage and display thereby, and
  (b) downloading the dynamic auxiliary component independent of the static component.

In such an embodiment, the static base component may include map data and the dynamic auxiliary component may correspond to advertisements to be displayed on a displayed section of the map in correct spatial relationship thereto according to the location of the advertisement owner.

In accordance with a fourth related aspect of the invention there is provided a method for doing business, including the following steps all carried out by a web server:
  (a) maintaining a commercial subscriber database including a plurality of records each containing data relating to commercial subscribers including at least name, address and category,
  (b) receiving from a client machine connected thereto a request to download data relating to at least one specified category of commercial subscriber,
  (c) extracting from the commercial subscriber database respective records and uploading to the client machine for display thereby,
  (d) allowing receipt of an update from one or more commercial subscribers in respect of substitute or supplementary data to that containing in the respective database record of said one or more commercial subscribers,
  (e) updating said commercial subscriber database as required,
  (f) checking whether a client machine is on-line and has extracted data from the respective database record of said one or more commercial subscribers, and if so
  (g) downloading to the client machine the update in respect of each of said one or more commercial subscribers for display on the client machine.

In the preferred embodiment a layer of map data is downloaded from the map server and cached at the client machine.

The map data contained in the cached layer is reconstituted and at least part of the map data is displayed on the display device. Whilst displaying the map data on the display device, further layers are downloaded as required so as to allow progressively more detail to be cached and displayed by the client machine.

It is helpful to compare the approach proposed by the invention with that taught by above-mentioned U.S. Pat. No. 5,966,135. Both, in fact, teach layering of the map data so that only those layers actually requested by a user need be downloaded thereto. In particular, a map picture can have several map layers, each map layer providing additional information for the map picture. However, in the case of U.S. Pat. No. 5,966,135, only partial data in each layer is actually extracted from the map server and sent to the client machine, corresponding to that data in each layer which is actually needed by the client machine to display the requested map section. Thus, once a map section is generated and displayed by the client machine, if the user now wishes to view a section of the map that is not currently displayed (i.e. off screen), then the map data in each layer corresponding to the newly-requested map section must be extracted from the map server and downloaded to the client for rendering.

In the present invention, too, the layers identify a grouping of map objects, which are graphical entities and which may have textual descriptive data associated therewith. In particular, a map picture can have several map layers, each map layer providing additional information for the map picture. For example, different layers can contain different road classes, buildings, symbols and so on. However, in the invention the layers are self-contained map data that can be quickly reconstituted independent of the server so as to permit the client machine to render the complete layer or, more typically, a confined area thereof. Moreover, the complete layer is cached by the client machine so as to allow subsequent processing thereof by the client machine independent of the map server. Within the context of the invention, the term "cached" is used to denote that the received data is either held in RAM so as to be immediately accessible when required or that it is archived on disk, if insufficient RAM is available. During this process, further layers may be downloaded and rendered so as to display progressively more detailed map data on the client machine. Thus, initially a single low volume layer containing all class "A" roads might be downloaded from the map server to the client machine. Even for a large map area, this process typically takes no more than 40 seconds and gives the viewer the immediate sensation of seeing the complete map section. Once the data is downloaded to the user's machine, software in the user's machine decompresses the data and starts to render it (i.e. make is visible to the user). During the time that the initial map data is being rendered, there might be downloaded to the client a subsequent layer containing all class "B" roads, this being repeated as often as required until all roads have been downloaded. Thereafter, there might be downloaded another layer containing bridges; and then another layer containing railway tracks; followed by a layer containing footpaths; and so on. The process is repeated in the background layer by layer until a complete map is presented to the viewer. Thus, map data relating to a required map region is downloaded layer by layer, whilst typically only a section of this map data is actually rendered on the user's display screen. This offers several distinct advantages over hitherto-proposed approaches. First, the user is given the sensation of very much faster response time since initial map layers need not (and generally do not) contain vast data, but only sufficient data to give an overall impression of the requested map. Secondly, during the time that the first layer is being rendered and assimilated by the user, subsequent layers can be downloaded and rendered, thus building up layer by layer a progressively more detailed map. Thirdly, whilst this happens, the viewer can work on the map data that has already been downloaded. For example, he can zoom in on an area of the map so as to magnify the scale thereof and allow data to be displayed at higher resolution. That is to say, data that was originally not displayed since it could not be shown legibly, can now be shown because such data is to be shown for a sufficiently small area of the complete map. However, the data itself that is now to be rendered has already been downloaded to the client machine. Thus, there is no need to process the data on the map server in order to generate fresh map data, and then download the fresh map data to the client machine.

In U.S. Pat. No. 5,966,135, when zooming in on an area requires obtaining additional map data, the map viewer reads a map window file to obtain the location of the additional map data, i.e. on which map server it is stored. The map viewer downloads this newly-requested map data from the specified map server and generates a new map picture with the new data. Then, the map viewer displays this new map picture. The requirement to download new data from the map server to the client machine each time additional map data is to be shown is time-consuming, particularly in low-bandwidth communication channels.

Only when zooming requires that an area be viewed at merely higher magnification, as explained in detail above, because the map picture is generated with vector-based data that has already been downloaded, the map viewer is able to immediately generate a new map picture with the resolution requested using the vector-based data.

Part of the motivation behind the invention is the understanding that maps are not conventional pictures but rather can be represented as a collection of vertices and names ("map data"). This representation is well known as Vector representation. This "map data" consists of numbers (for vertices) and ASCII-codes (for street names), which can be easily compressed with a meaningful compression rate. After handling the data and compressing it, clients receiving this information must be able to reconstruct it into a drawing of a map. For this, there is provided a low volume module that occupies less than 5 Kb, and can be easily plugged into an HTML page (as an applet for example). Such an approach allows a breakthrough in downloading maps over a slow network like the modem Internet connection.

The invention enables the transfer over the Internet, on a low bandwidth connection, of a highly detailed map that covers a large enough region for representing a full activity ring (e.g. a city), within a matter of seconds. Specifically, the map data that is downloaded to the client machine extends well beyond the boundary of immediate interest, thus allowing navigation beyond the boundary of immediate interest without the need to download new data from the map server. Thus, the fact that all the information representing the desired ring, (including the engine that actually draws the map), are transferred to the client machine, permits immediate and free navigation on the map without repeated need of the host server's services. This method relies on the fact that the engine transferred to the client is low volume (less than 5 Kb) and its loading waiting time is negligible. Furthermore, even when faster communications can be achieved, the invention will continue to show an improvement over current approaches allowing the transfer of approximately six times the region that can be covered by the maps transferred using standard techniques. More significantly, sufficient map data is transferred to the client machine to allow extensive navigation without requiring the transfer of more map data.

The method and system according to a preferred embodiment of the invention rely on two major components:
 i. Map server application.
 ii. Map client application.

Map Server Application

The Map server application awaits connection of clients and serves them as they arrive. Among its features as a server application it has several unique features. It supplies compressed data packets, and section of a map in Vector representation to the connected clients. Each one of these packets can be individually and independently transformed to a drawing, without being dependent on other packets. That is to say, each packet is independent and relates to independent features of the same map and so the engine can draw each packet as it arrives. This enhances the impression of immediate response since the client computer can receive a relatively small map section and display a corresponding image substantially immediately, there being no need to await the arrival of contiguous map sections or auxiliary map data of any kind.

The Map server's data streaming process is so designed as to leave the user with the impression of a highly fast network connection.

The Map Client Application

The Map client application is complementary to the Map server application and has two versions:
 a. Application
 b. Applet The client performs the following operations:
 i. Retrieving and handling the compressed data packet.
 ii. Reconstructing the data into an accurate map section.

The Map client application can be easily plugged into an existing HTML page; it is designed to be a fully portable across different browsers and platforms and can be accessed from the two major Internet browsers (Internet Explorer 4 and later versions and Netscape 3.0 and later versions).

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF SPECIFIC EMBODIMENTS

Overview

Figure 1:
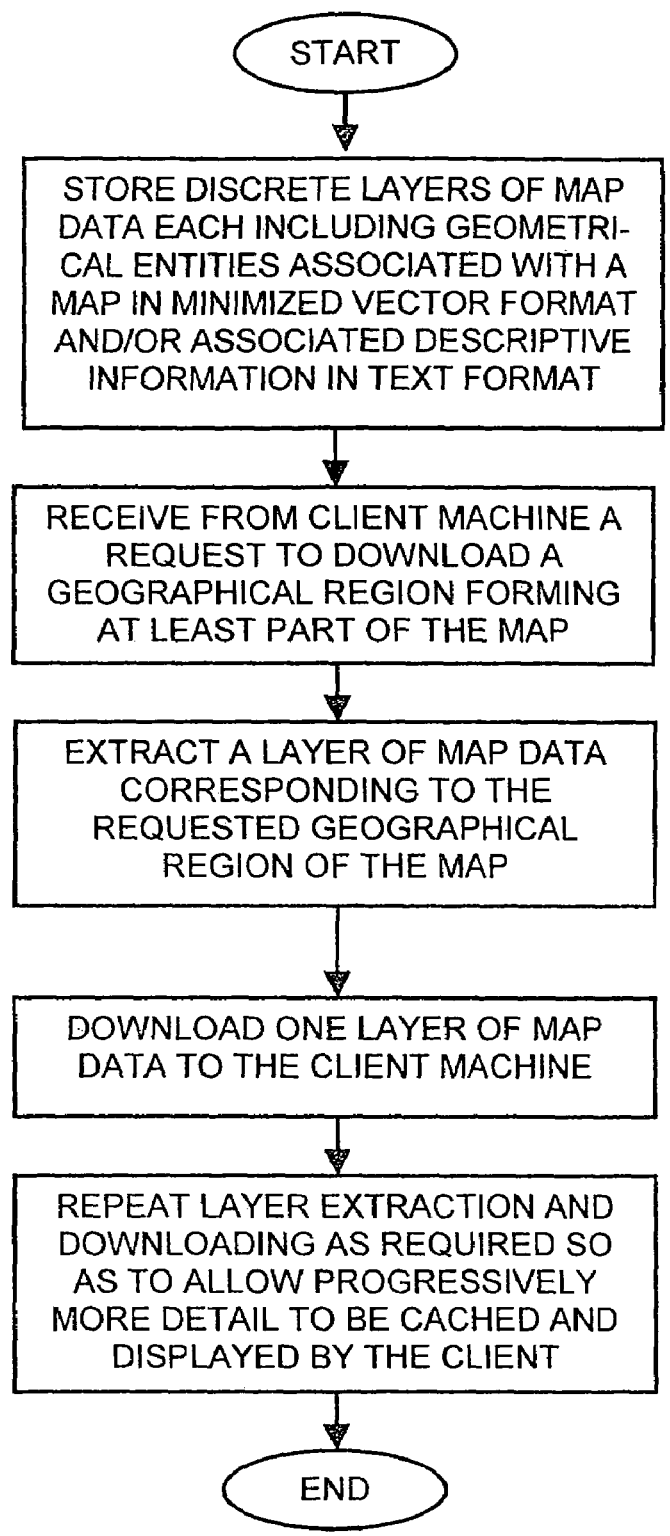
FIG. 1 is a flow diagram showing the principal operating steps carried out by a Map server for downloading map data to a client machine in a method according to the invention.
Figure 2:
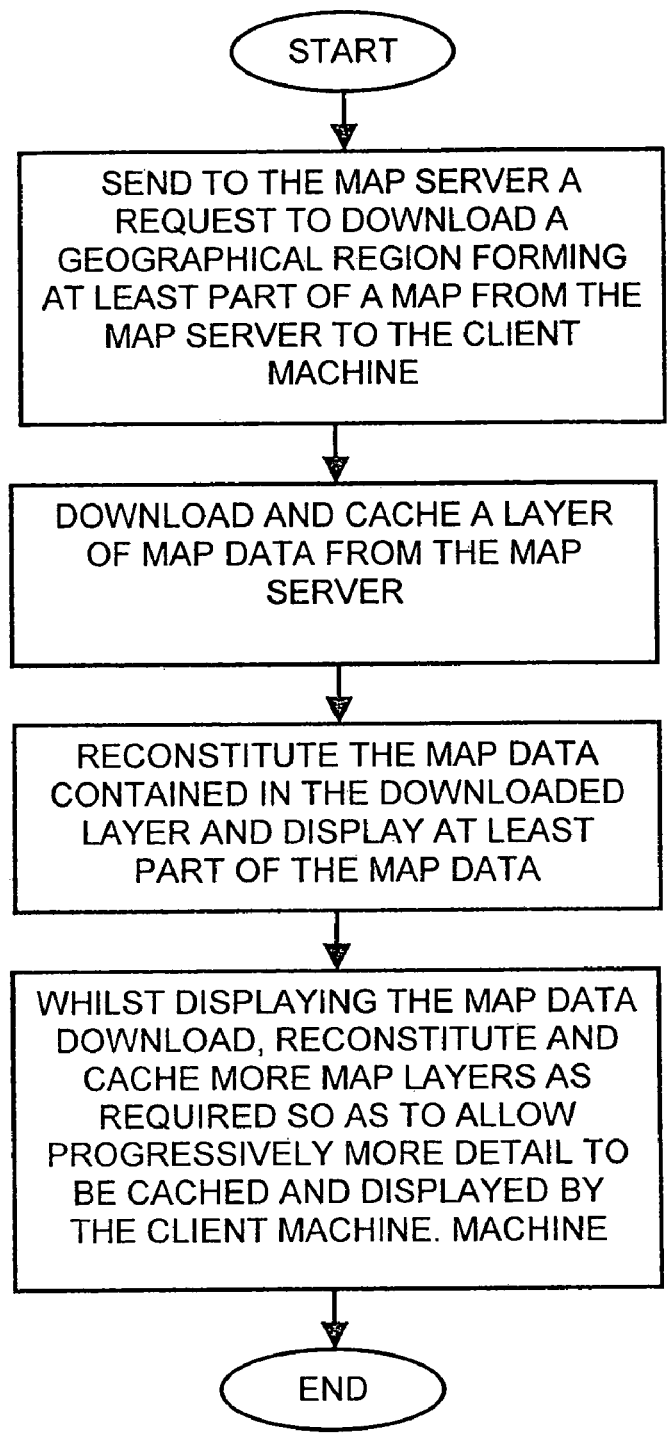
FIG. 2 is a flow diagram showing the principal operating steps carried out by the client machine.

FIGS. 1 and 2 are flow diagrams showing the principal operating steps carried out by a map server and a client machine, respectively, for downloading sufficient map data to the client machine to obviate the need to download further map data in order to execute navigation commands input to the client machine. Thus, data is stored in a database on the map server in layered format, each layer including geometrical entities associated with the map in minimized vector format and/or descriptive information in text format relating to the geometrical entities. The map server extracts map data layer by layer and downloads in compressed format to the client machine, which reconstitutes and caches the map data and displays at least part of the map data. The whole process is repeated layer by layer so that the detail of the map picture displayed by the client machine is progressively augmented. During this process, an operator of the client machine may enter navigation commands so as to navigate through the displayed map picture without requiring new map data to be downloaded from the map server.

Map Server Application

Figures 3, 4:
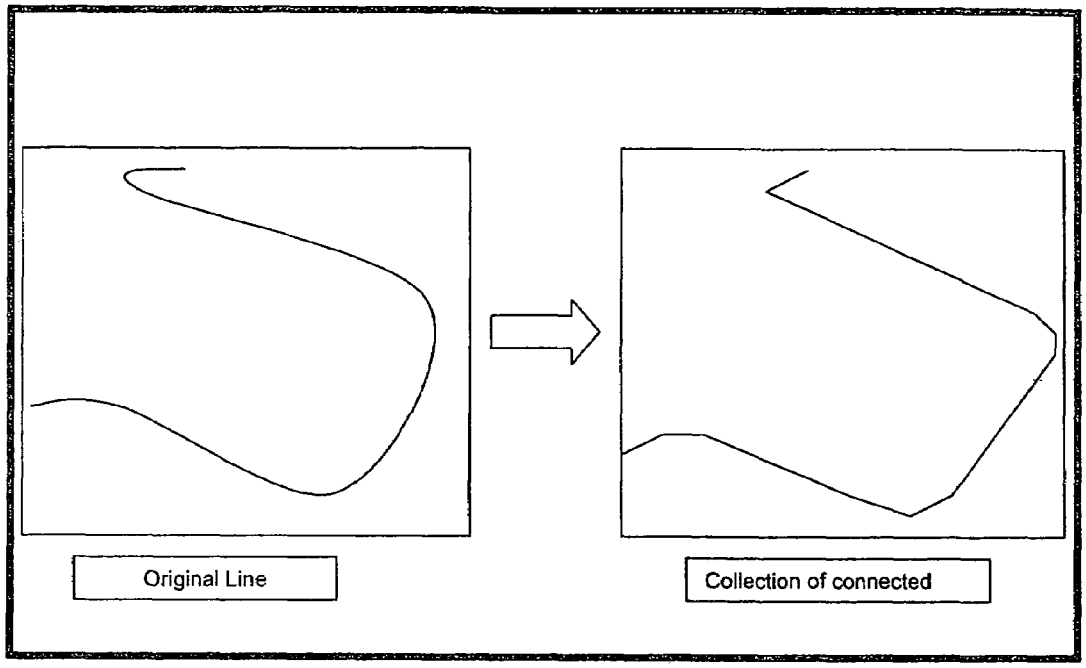
FIG. 3 shows pictorially how one smooth line is represented as a collection of several interconnected straight lines.
FIG. 4 is an example of two "minimal sorted group" structures.

This module is divided into three parts:
 i. Preliminary data preparation process
 ii. Data minimization process
 iii. Data Transfer process Preliminary Data Preparation Process FIG. 3 shows a first stage in the process, whereby a continuous road section 10 is transformed to a collection of mutually interconnected straight line segments 11, 12, 13 . . . 17, 18, 19.

The initial Vector data of a map is a database file (.mdb, .txt, .xls etc). This database contains detailed description of variety of elements in the area that this map represents (like parks, streets, lakes . . . ). The first step in the Preliminary Data Preparation Process is the creation of a new filtered compact database that contains the minimal information needed for reconstructing therefrom a drawing of the map.

The elements that are included in the minimal database are streets and roads. The format of the data is: Id, Name, Type, x1, y1, x2, y2, where:

| | |
|---|---|
| Id | a unique id number for this street/road. |
| Name | the name of this street/road |
| Type | the type of the street/road (main traffic, dirt, narrow . . .) |
| x1, y1, x2, y2 | the coordinates that defines a simple geometrical line which is a section of the street/road itself. |

FIG. 4 shows the result of a second stage in this process, wherein the data is manipulated in the minimal database so as to be sorted by the Type and the Name. As shown in FIG. 2, the resulting data comprises groups of streets/roads with the same name and same type ("Minimal-sorted group").

Data Minimization Process

The purpose of this process is the creation of a minimal data structure (link list) that holds all the "Minimal-sorted group" information, as efficiently as possible to be sent to the client. In order to achieve it, three special "non-lossy" optimization techniques are used:

Each "Minimal-sorted group" contains the information (coordinates) of a single street/road and a single type. Each "Minimal-sorted group" is represented by a corresponding data structure (link list) in which both the name and the type appears only once (at the beginning) and the rest of the information refers to the same street/road.

Owing to the fact that the line segments that represent roads/streets are connected to each other end to end, all the "x2, y2" of all the lines except the last line can be eliminated since "x2, y2" of each line segment is equal to "x1, y1" of a subsequent line segment.

Figure 5:
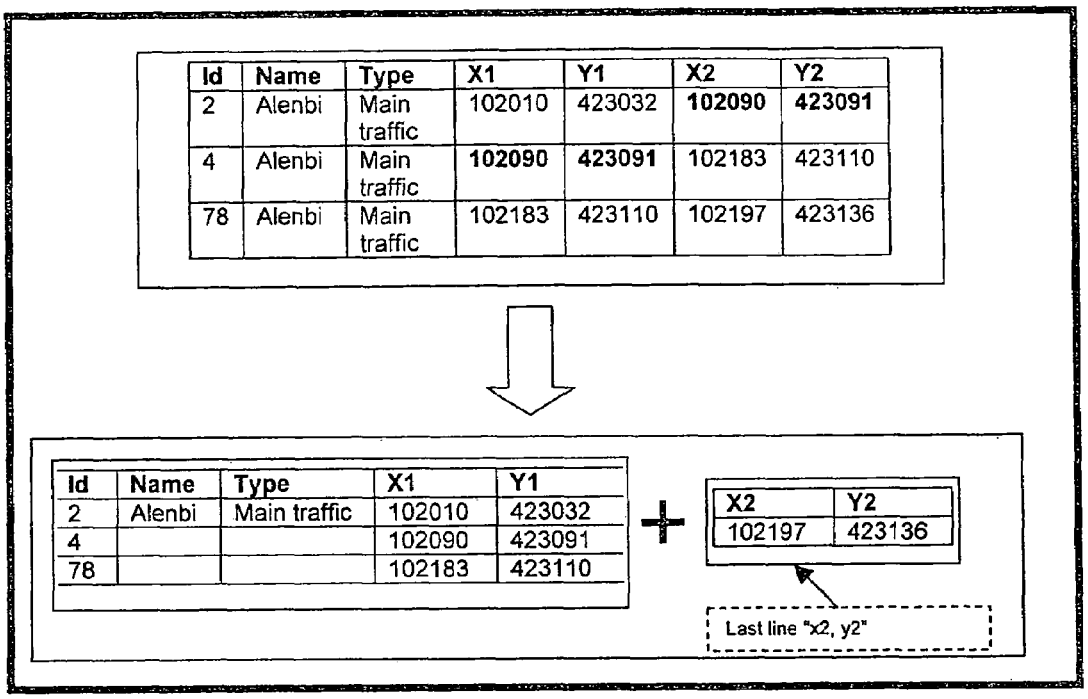
FIG. 5 illustrates a subsequent stage of the Map server's Data Minimization Process, in which the end coordinates of all the lines except the last line are eliminated.

FIG. 5 shows the result of this optimization which can save about 50% of the information (if there are 'n' lines, each line is defined by two points (making a total of 2*n points), each point is defined by 2 coordinates (2*2*n =4*n coordinates). After this optimization, only 2*(n+1)=2*n+2 coordinates are needed, i.e. a reduction of very nearly 50%.

Figure 6:
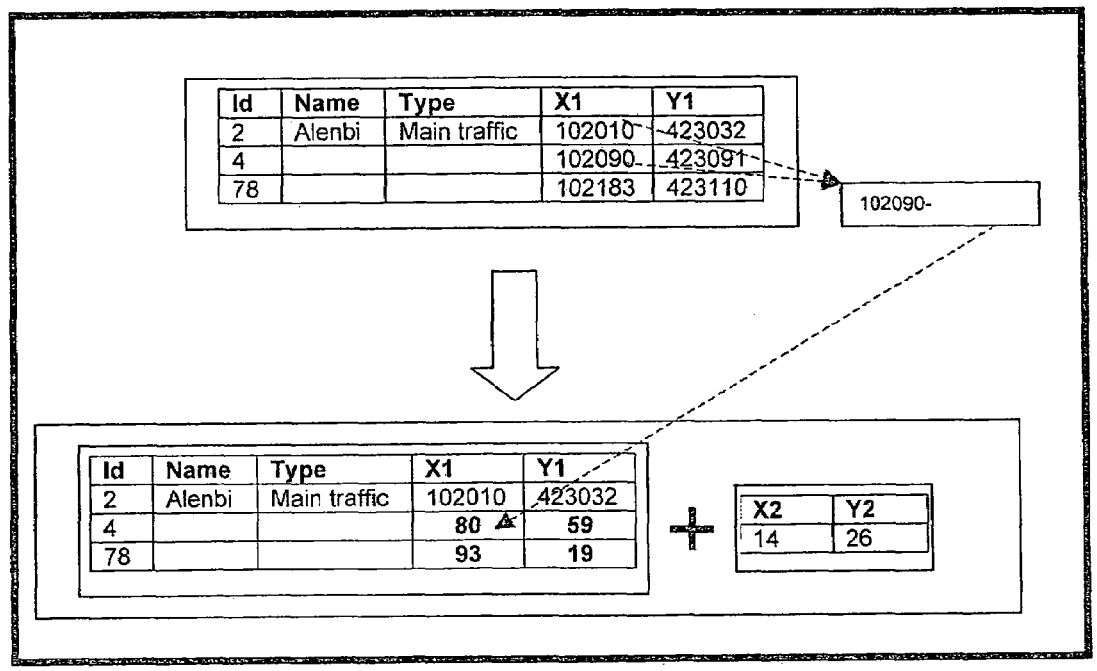
FIG. 6 illustrates a subsequent stage of the Map server's Data Minimization Process, in which the 5-6 digits of the original coordinate are replaced by offsets (usually two digits)

FIG. 6 shows the result of a subsequent optimization technique for minimizing data whose value will be appreciated when it is observed that each coordinate is a number of 4-6 digits. Instead of each time holding the full coordinate, only the first coordinate is saved completely, and the rest are represented as an offset from a previous coordinate, thus reducing the number of digits on average from 5 to 2.

Figure 7:
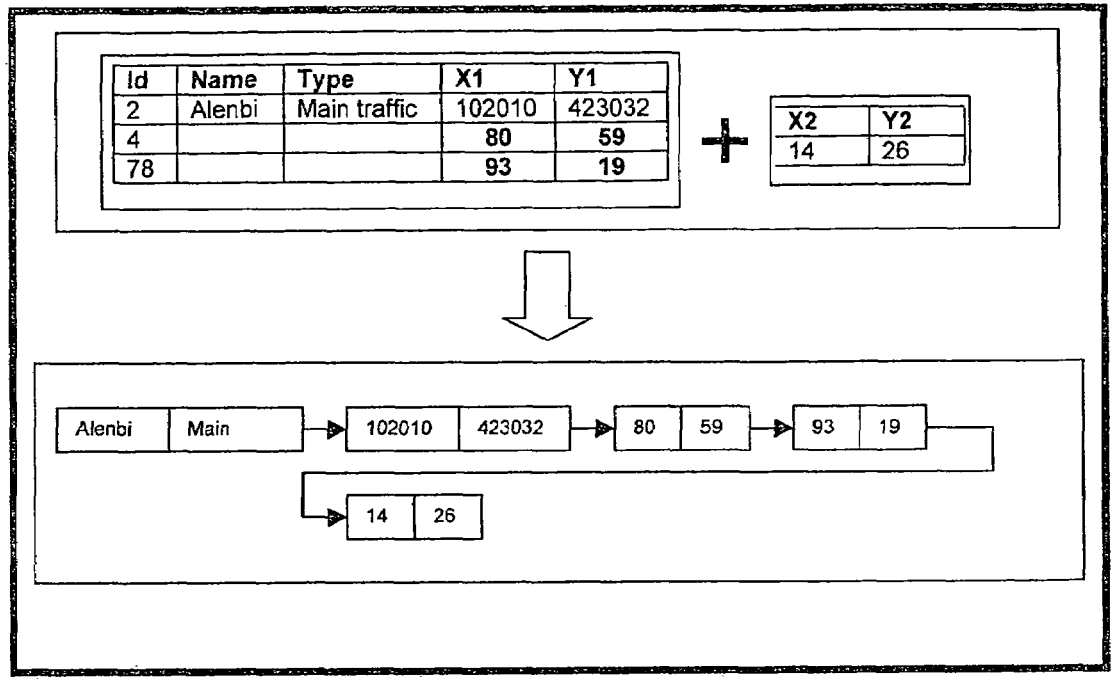
FIG. 7 shows schematically reconstruction of street data from the compressed data structure.

FIG. 7 shows the result of running these techniques, from which it is seen that each "Minimal-sorted group" is represented as a minimal data structure (link list) that contains all the information needed to restore the initial data. The minimal data structure occupies less than 50% of the size of the data in the original format. The last operation that is now performed is to create a compressed (zip compression) file for each data structure. The compressed files (constituting packets of data) are used by the Data Transfer Process. The compression reduces the size of the minimal data structures to about 30% of their original size (after running the minimization process). The outgoing packets are about 15% of the size of original data.

Data Transfer Process

This process is responsible for transferring the compressed data to the clients. The preliminary operation is the creation of an array in the Map server's memory that holds all the compressed files (packets), as a collection of bytes (binary format). The compressed-files-loading-order is important, as it also sets the transfer order. The loading process begins with the main traffic streets/roads and ends in loading the small dirt roads/streets.

As the array of packets is fully loaded, the Map server is prepared for data transfer. The second a client arrives, the data transfer process starts (it is done in the background using a new thread) in which all the packets are transferred to the client, one by one. An important thing to mention is that each packet contains information that can be easily and independently reversed engineered by the receiver, to restore it to the original format of data.

Map Client

Figure 8:
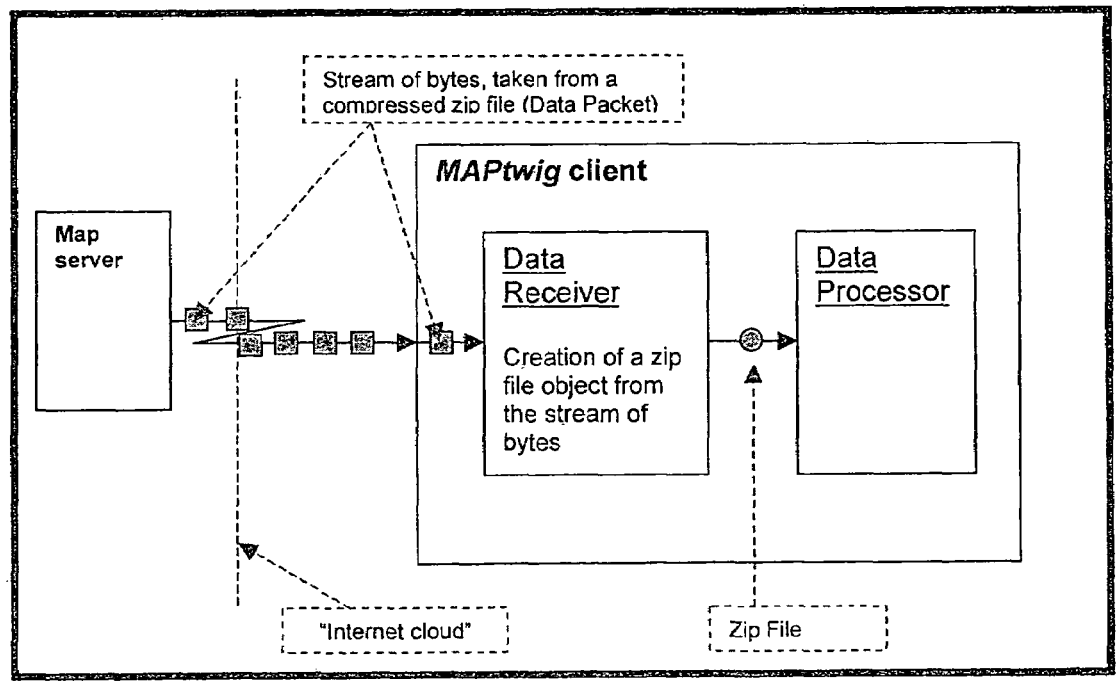
FIG. 8 shows pictorially the data flow, from the server to the client.

This module is divided into three parts:
  i. Data receiver
  ii. Data processor
  iii. Drawing engine Data Receiver FIG. 8 shows pictorially a detail of the data receiver responsible for receiving the packets of data straight to the machine's memory. It receives all the packets (compressed files) one by one and transfers them to the Data Processor, for further manipulation. The receiving process starts as the stream of bytes arrives from the Map server. After receiving all the bytes related to the same packet, it builds a "zip" file object from those bytes. This object is transferred to the data processor.

Data Processor

The Data Processor is responsible for restoring the original data format from the incoming compressed data. It is divided into two stages:
  i. Decompressing the zip object
  ii. Restoring the original data format.

Stage a: the compressed file, as it appears in the machine's memory, is a collection of bytes with no visible logical interrelationship (it looks like random collection of bytes). In order to deal with the content it actually holds, it must first be decompressed. In this stage, the zip file object is decompressed into the data structure that holds all the information (minimal information) for restoring the "Minimal-sorted group". FIG. 7 shows this data structure as the result of the Map server's Data Minimization Process.

Stage b: This stage operates reverse engineering to the inputted data structure. Reversing the Map server's Data Minimization Process optimizes the drawing process as it saves lots of arithmetical operations that, otherwise, would be done repeatedly. The flow of this process corresponds exactly to the Map server's Data Minimization Process, only in reversed order. The result of this restoration process is a data structure that holds all the lines that represent the current street/road in addition to textual data relating to its name and type. Each zip file object is transformed into the above data structure, and all of these structures are held in one array ("main array"). This array is used by the Drawing Engine.

Drawing Engine

Figure 9:
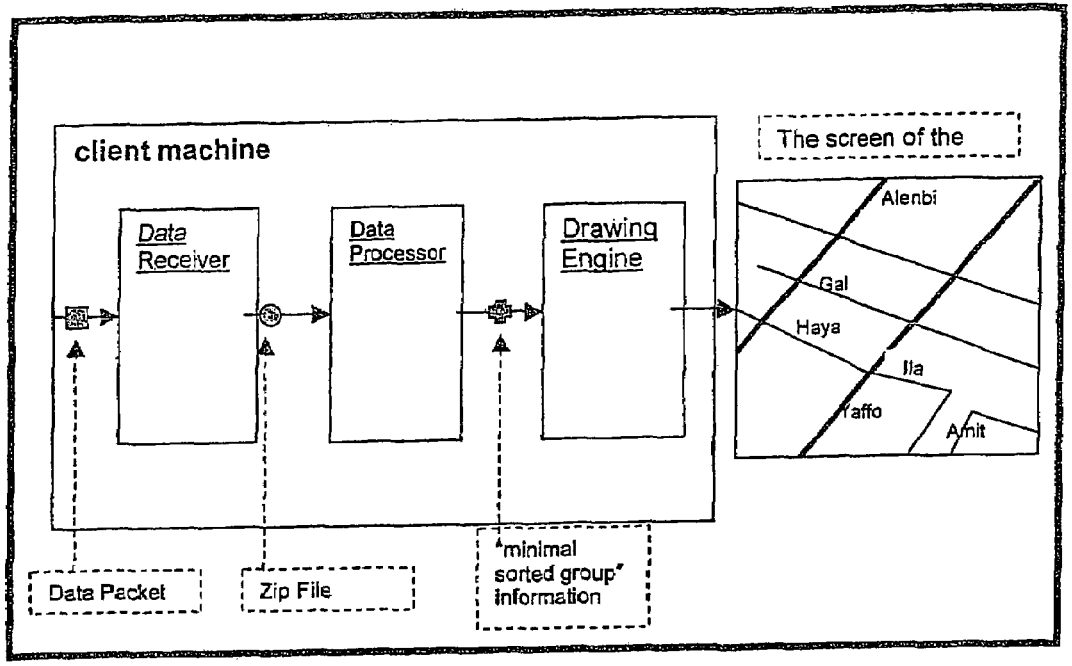
FIG. 9 shows the creation of the visual map section during the final stage of the data processing.

FIG. 9 shows the resulting image produced by the drawing engine. The drawing engine is responsible for the map visualization process and converts each item in the incoming array ("main array") from the Data Processor into a drawing of a specific type of street/road. The drawing process runs cyclically over all the items in the "main array", and draws lines with names alongside them. The fact that each item in the "main array" represents a different type of street/road, allows the Drawing Engine to customize the visualization of the types by many parameters like color, thickness etc (for example: main traffic roads may be represented by thick black lines, and narrow streets by thin lines, colored differently . . . ).

The coordinates, each of which is received by the drawing engine in its original format (5-6 digits), must be somehow fitted to the size of the screen, in pixels. This operation is a linear transformation in which each coordinate is transformed to a new corresponding coordinate in pixels.

Preferably, the invention is applied to an activity ring map as an Internet platform for unlimited various layers of information from lots of fields of interest. This platform may be followed by various toolbars for different queries of the data that can be represented on the map. Furthermore, when used as part of an Internet platform, each object that appears on the map can become a live independent entity that can be contacted interactively in real-time through all the various connection methods like email, audio, chat, video, home page and so on.

Figure 10:
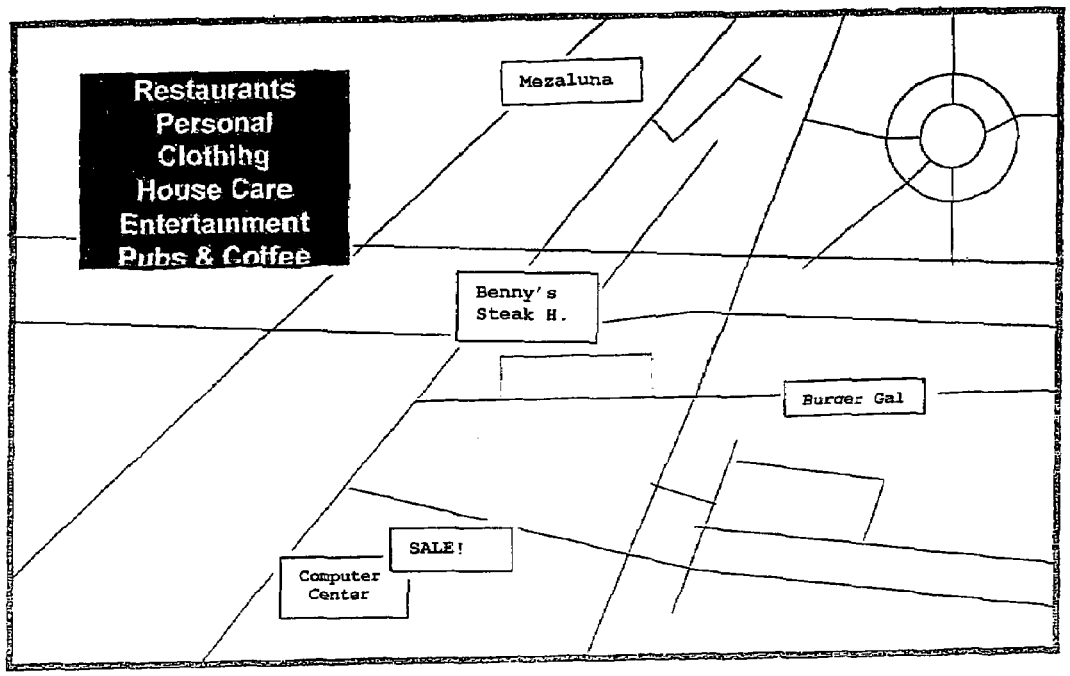
FIG. 10 shows pictorially an exemplary screen dump after making a query of restaurants and computers.

Suggested methods for using the invention as an Internet platform include:

1. Creating visual "Yellow Pages" for each city in the world. In this case, the underlying database should contain the list of all the business places in the area (including their location). As shown in FIG. 10, a program stored in the client machine displays a toolbar allowing the user to query the database and to extract sections of maps correlating with his or her query. The advantage of such "Yellow Pages", is the ability of each business to change/update its information as easily as accessing the Internet. Further-more, the business is able to update sales or discounts directly through the Internet, and alter its appearance on the map so as to reflect such information visibly to the client. For example, a blinking logo can represent a current "happy hour", or there may be displayed at the business location on the map a "Sale" sign indicating that a discount is being offered by the specified business. Via the client program, users may define and save customized personal requests for querying the map database for specific landmarks in a specified region, e.g. Italian restaurants offering discounts, personal clothing stores and so on. The data corresponding to such customized personal requests can be downloaded to the host server, which extracts from the map database the specified region and highlights the requested landmarks.

The ability to correlate between the map database and one or more landmarks can be implemented in both directions: consumers to suppliers, or suppliers to consumers. Thus, consumers can leave their demands according to several criteria (including location), and let the suppliers respond. For example, suppose a consumer wants to purchase a compact disc player capable of both playing and recording up to $200. The consumer enters this data via the client program and downloads it to the map web site. The map server cross refers in the map database for all relevant suppliers and circulates the demand to those suppliers. A supplier receiving the consumer's request can respond affirmatively to the map server whereupon the relevant section of the global map is circulated back to the consumer with the map location of the supplier being highlighted.

However, it should be understood that display of the underlying map data is optional. In the absence of such display, the system provides basic information corresponding to printed "Yellow Pages" which present a listing of commercial enterprises addressing specified criteria. Printed "Yellow Pages", of course, sort the data according to alphabetical subject headings such as Health Resorts, Hospitals, Hotels, and so on. The invention allows much more than such basic information to be downloaded to the client machine. First, the data that is displayed on the client machine is preferably confirmed to a narrow geographic area of interest specified by the operator of the client machine. In the case that the display of such information is allied to the prior display of map data, the geographic area is specified by entering navigation commands using suitable navigation keys (e.g. UP, DOWN, LEFT, RIGHT, ZOOM IN, ZOOM OUT and so on). In the case of a standalone system that is adapted to display only the data associated with specified commercial enterprises, selection criteria can be entered either by way of predefined menus or using conventional key word searches. The selection criteria may or may not include geographic data restricting the display of advertisement data to a specified geographic area. For example, a user can display all vegetarian restaurants within a specified geographic area and data relating to all vegetarian restaurants in that area are displayed on the client machine. In the case that the display of such information is allied to the display of map data, the location of the restaurants is immediately apparent; otherwise, street addresses may be displayed in much the same manner that corresponding information is presented in printed "Yellow Pages".

However, the principal benefit of such an approach resides not in whether map data is displayed as a background to the commercial enterprise data, but rather in that, unlike "Yellow Pages" the commercial enterprise data may be dynamic in two senses. First, it may display features dynamically such as animation scripts, graphics and so on. Second, the data itself may be updated dynamically as explained above. Thus, consider the previous example where a client machine has requested that data relating to all vegetarian restaurants in a specified area be displayed on the client machine. If now a vegetarian restaurant in that area has a "business lunch special" details thereof can be downloaded from the vegetarian restaurant (or a marketing firm thereof) to the map server. The latter knows that a client machine has requested data relating to vegetarian restaurants in a specified area and is still on-line (i.e. connected to the map server). It therefore downloads the supplementary data relating to the specific restaurant to the client machine, where it is immediately displayed either independent of any map data or in proper spatial relationship to a street map previously downloaded to the client machine. In either case, it is to be understood that the supplementary data relating to advertisements and so on is not map data and its being downloaded independent of, and supplementary to, any previously downloaded map data does not affect the map display but merely superimposes advertisement data thereon. Thus, even in the case where the display of advertising information and the like is allied to the display of map data, no new map data need be downloaded from the map server in order to accommodate a client machine's request.

The ability to send advertisement data in this manner provides an effective mechanism for financing the system. In much the same manner that commercial enterprises (or subscribers) pay for subscription to "Yellow Pages" so too they must pay the service provider operating the map server for inclusion in the database. Moreover, in the same manner that the cost to commercial enterprises for inclusion in "Yellow Pages" depends on the type of entry (specifically how large and prominent it is) so, too, the service provider may operate different tariffs according to specified criteria. In particular, updating data as described above may be subject to a larger tariff to which there may even be added a supplement for forwarding to an on-line client. Likewise, there may be a higher rate for downloading registered trademarks associated with the commercial enterprise since these, by their very nature, are particularly distinctive and therefore prominent. It should be understood that the term "commercial enterprise" includes any entity paying for subscription to the service provider.

Figure 11:
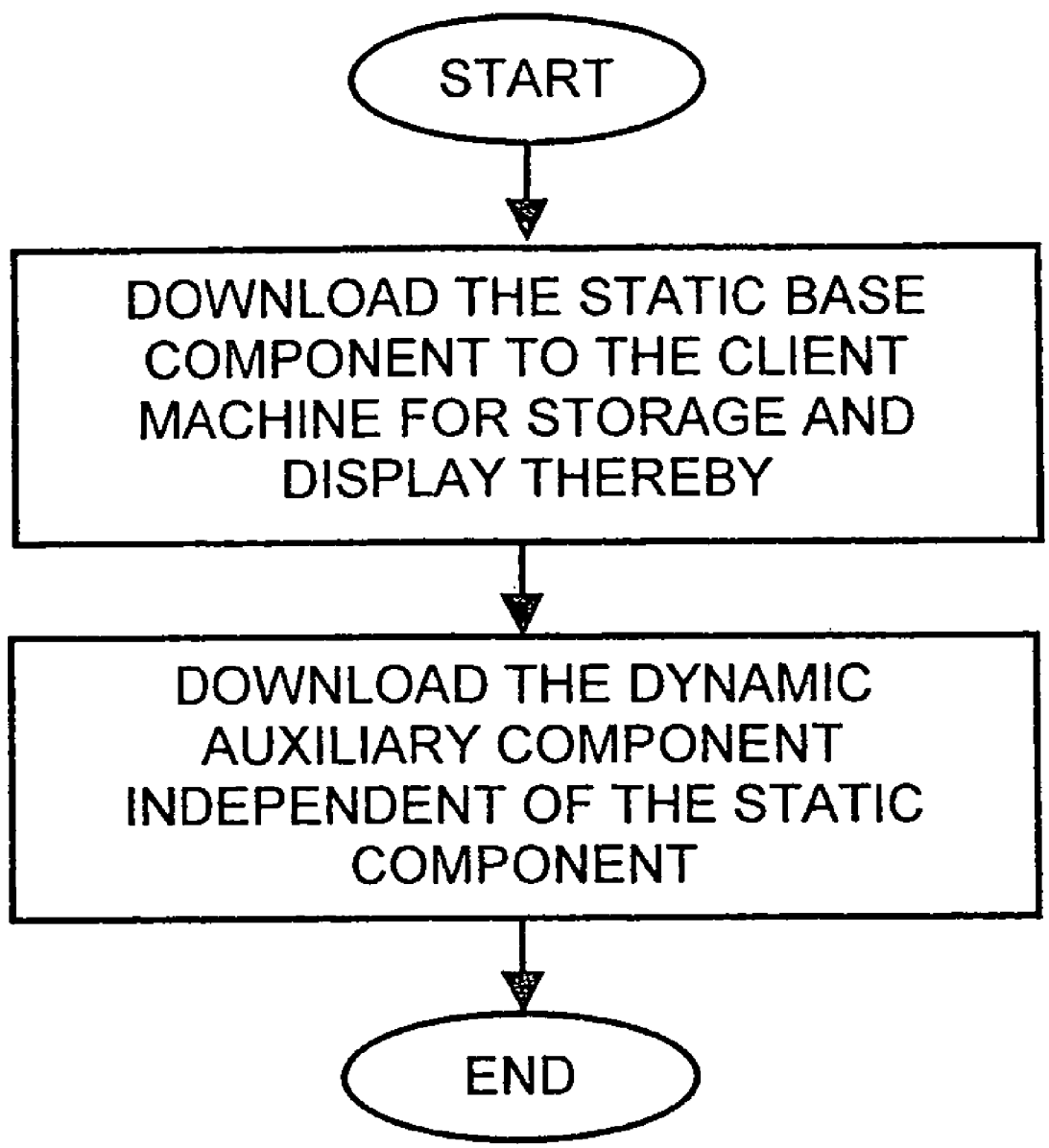
FIG. 11 is a is a flow diagram showing the principal operating steps carried out by a web server for downloading to a client machine data having a static base component and a dynamic auxiliary component.

FIG. 11 is a flowchart showing a method according to the invention for downloading from a web server to a client machine data including a static base component and a dynamic auxiliary component. The method comprises the following steps carried out by a web server:
(a) downloading the static base component to the client machine for storage and display thereby, and
(b) downloading the dynamic auxiliary component independent of the static component.

Figure 12:
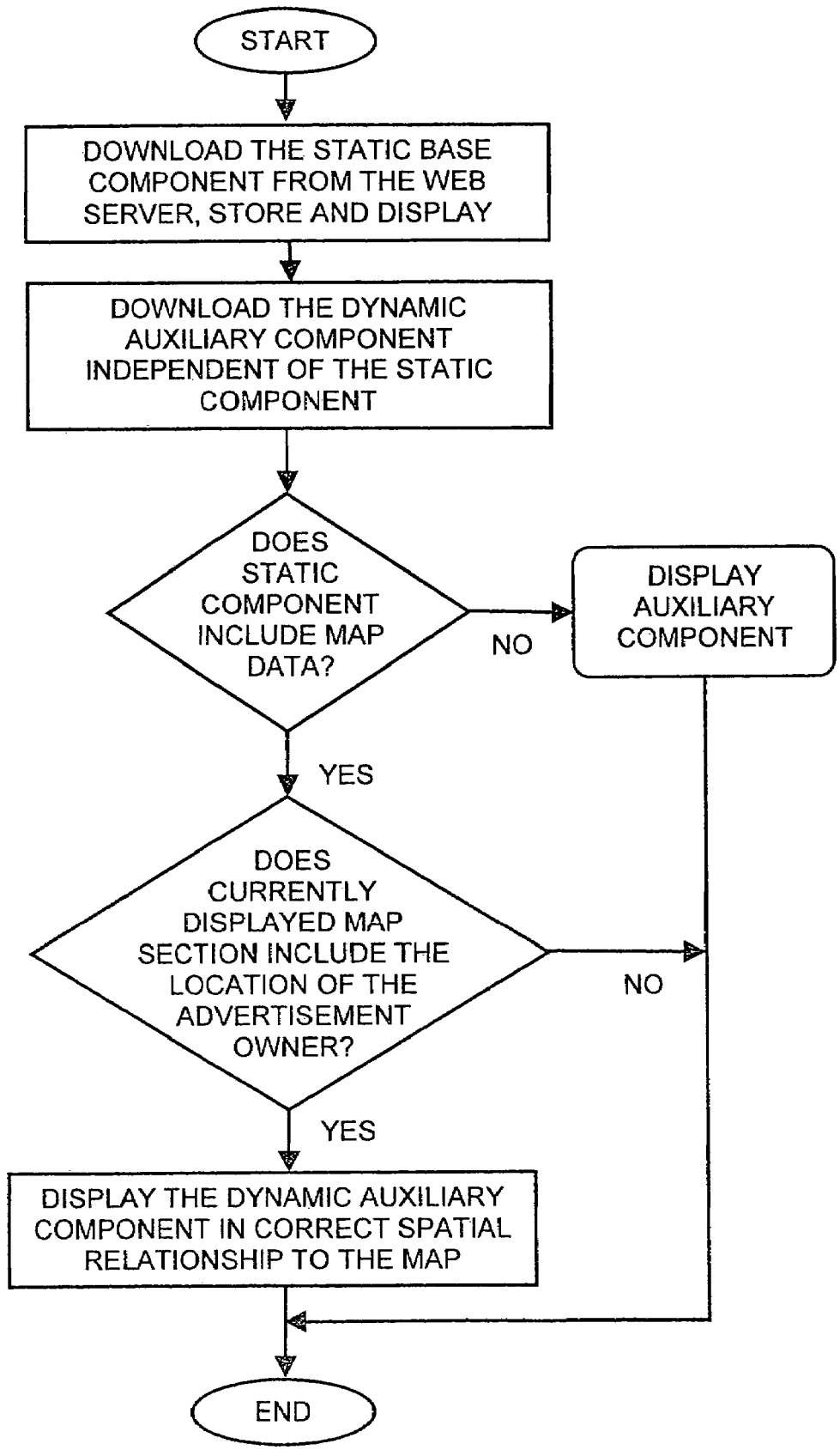
FIG. 12 is a is a flow diagram showing the principal operating steps carried out by a client machine for downloading from a web server data having a static base component and a dynamic auxiliary component.

FIG. 12 is a flowchart showing the corresponding method steps performed by the client machine which downloads, caches and displays the static base component, and then independently downloads, caches and displays the dynamic auxiliary component.

When related to the map server application, the static base component may include map data and the dynamic data may correspond to advertisements to be displayed on a displayed section of the map in correct spatial relationship thereto according to the location of the advertisement owner. In such case the client machine determines whether a currently displayed section of the map includes the location of the advertisement owner, and if so displays the dynamic auxiliary component on the displayed section of a map in correct spatial relationship thereto. The dynamic component may come to replace an already downloaded and displayed data component. In such case, there are further included the steps of determining whether the dynamic auxiliary component is already displayed. If so, data in a display buffer corresponding to the dynamic auxiliary component already displayed is substituted with fresh data corresponding to the downloaded dynamic auxiliary component.

Figure 13:
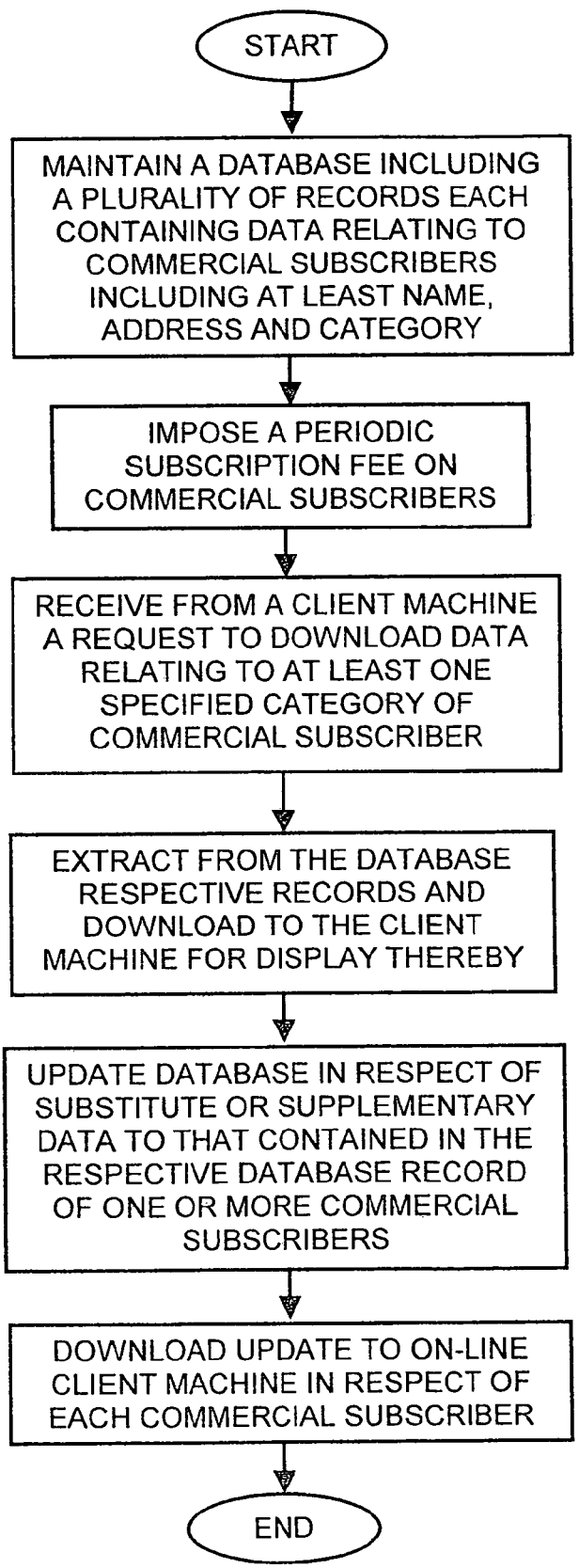
FIG. 13 is a is a flow diagram showing the principal operating steps carried out by a web server in a business method according to the invention.

FIG. 13 is a flowchart showing a related method according to the invention for doing business, including the following steps all carried out by a web server:
(a) maintaining a database including a plurality of records each containing data relating to commercial subscribers including at least name, address and category,
(b) optionally imposing a periodic subscription fee on at least some of said commercial subscribers,
(c) receiving from a client machine connected thereto a request to download data relating to at least one specified category of commercial subscriber,
(d) extracting from the database respective records and downloading to the client machine for display thereby,
(e) allowing receipt of an update from one or more commercial subscribers in respect of substitute or supplementary data to that contained in the respective database record of said one or more commercial subscribers,
(f) updating said database as required,
(g) checking whether a client machine is on-line and has extracted data from the respective database record of said one or more commercial subscribers, and if so
(h) downloading to the client machine the update in respect of each of said one or more commercial subscribers for display on the client machine.

As noted above, such a business method can be carried out independent of the whether map data forms the background against which downloaded data is displayed to the client. Moreover, the business method for displaying yellow pages, for example, is clearly independent of the mechanism by which advertising data is downloaded by the client from the web server. Thus, whilst the map data, as described above, is preferably structured in layers so as to speed up the manner in which it is fed to the client and to allow auxiliary data to be dynamically downloaded, this need not apply when downloading data from the yellow pages database. As will now be explained, the invention contemplates maintaining "yellow pages" database for optional subscription by business enterprises for on-line searching by a client. The data downloaded from the database by the client may, but does not have to be, displayed against a background of location data derived from a map, as explained above. Likewise, data downloaded by the client may be downloaded dynamically for layer-by-layer display against a static background: but it does not have to be. That is, the benefits of the yellow pages database, both to the business subscribers and to the clients, are quite independent of the mechanism by which data is downloaded and cached by the client machine.

Figure 14:
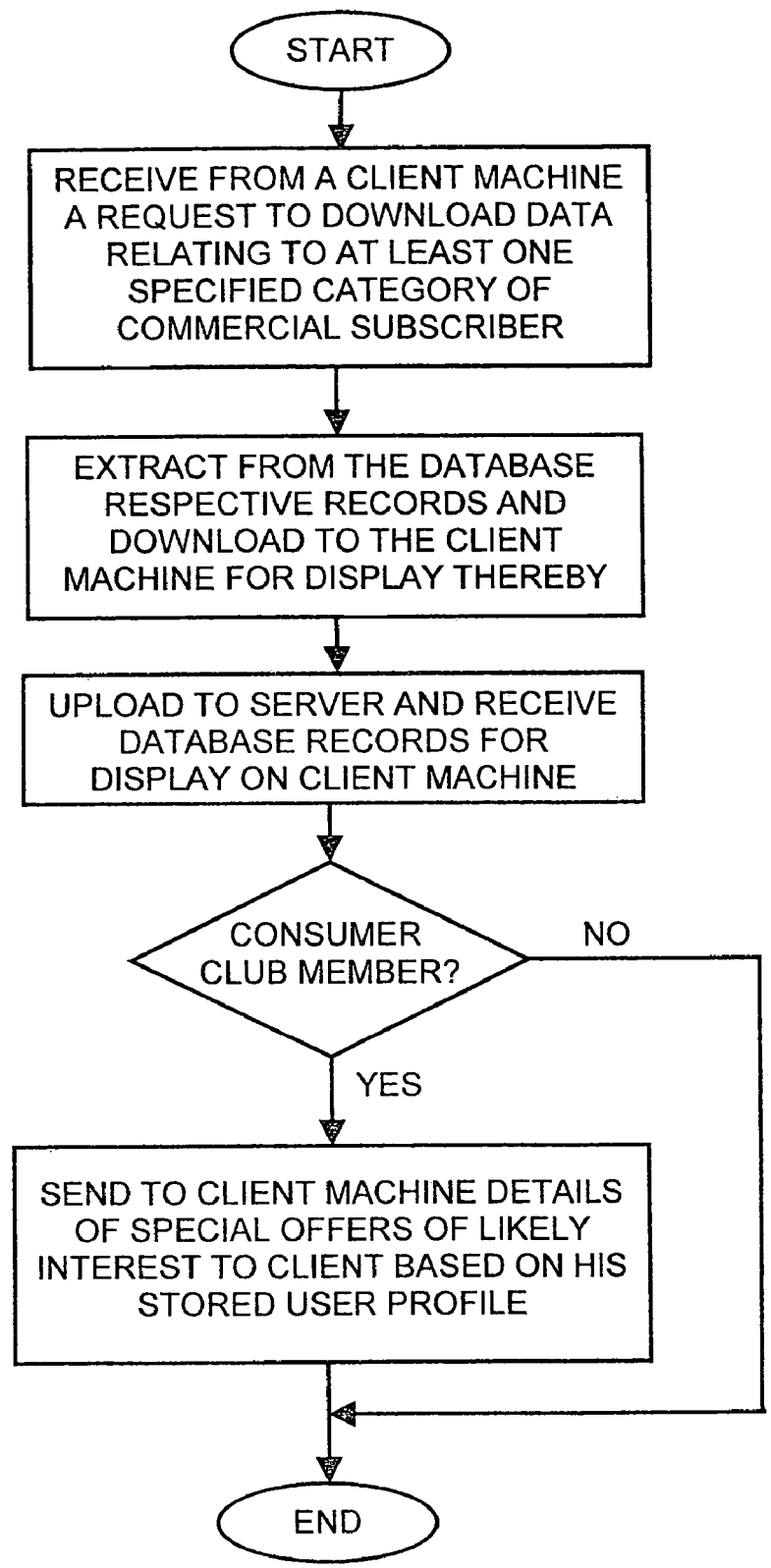
FIGS. 14 and 15 are flow diagrams showing the principal steps carried out by a web server and client machine for operating a "yellow pages" database and consumer clubs associated with subscribing business enterprises.
Figure 15:
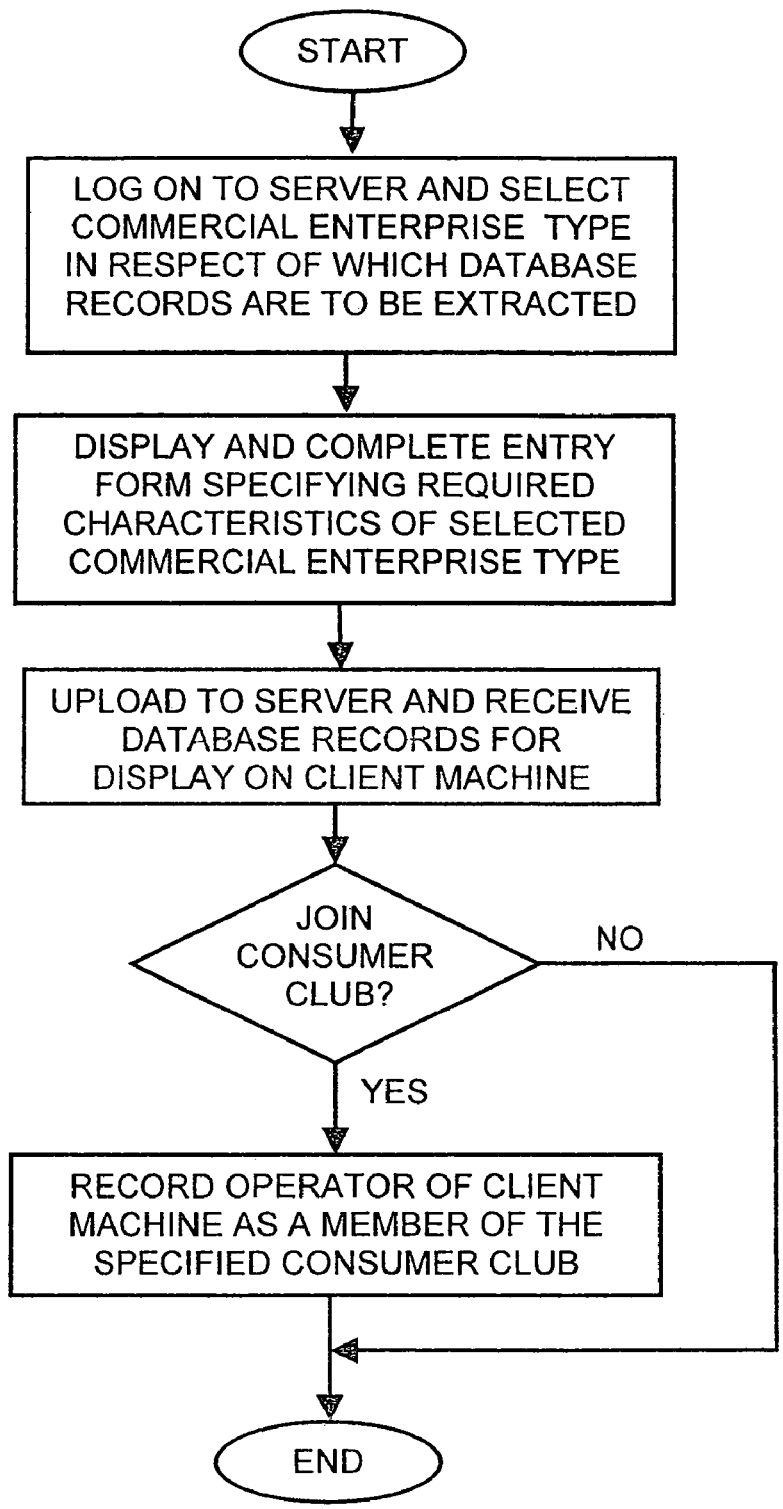

FIG. 14 shows further steps that may be carried out by the web server when providing access to consumer clubs run on behalf of business enterprises that subscribe to the yellow pages database, while FIG. 15 shows the corresponding steps carried out by the client machine. Thus, when the client logs on to the web server and selects commercial enterprise type in respect of which database records are to be extracted, the client may be given the facility to join a consumer club associated with downloaded business enterprises. If required, the client clicks on a displayed "consumer club" option, thereby opening a data entry form (not shown) allowing for entry of personal details. The personal details allow the web server to establish a user profile for the client, which may then be used for targeted advertising and the like. In particular, if the client downloads data relating to one or business enterprises that have special offers directed to a particular target consumer matching the personal profile of the client and if the client is a member of the selected consumer club, then the special offers may be downloaded to the client machine for display thereby.

According to such a business method, the client is encouraged to become a member of the consumer club, since only the is he eligible for the special offers. The consumer clubs themselves serve as incentives to attract the attention targeted consumers. This is particularly important for the business enterprises since they are essentially selected for display by the client according to type, and therefore generally data relating to many different competitors are downloaded from the web server to the client machine for display thereby. The actual business enterprise selected by the user is therefore largely influence by the "eye appeal" that the displayed data has to the end user. The need for "eye appeal" parallels the need in printed "yellow pages" to provide larger and more eye-catching advertisements so that a casual reader will be drawn to an attractive advertisement in preference to a less appealing advertisement of a competitor. Similar approaches may be adopted for financing the on-line yellow pages database run by the web server. Thus, a graded subscription may be applied according to the size of the listing to be displayed when a subscribing enterprise meets a client search criteria. For example, a simple basic listing may be provided for free. The textual data of the basic listing may be displayed using a larger and therefore more obtrusive font for a specified subscription fee. For an even higher fee, the basic listing may be displayed both magnified and bold. If the subscribing business enterprise wished to display a logo instead of the textual data corresponding to the basic listing, this may be stored in the database for a higher subscription fee. The logo may be displayed together with the basic listing for an even higher fee; and for an even higher fee the basic listing may be displayed super magnified.

Figure 16:
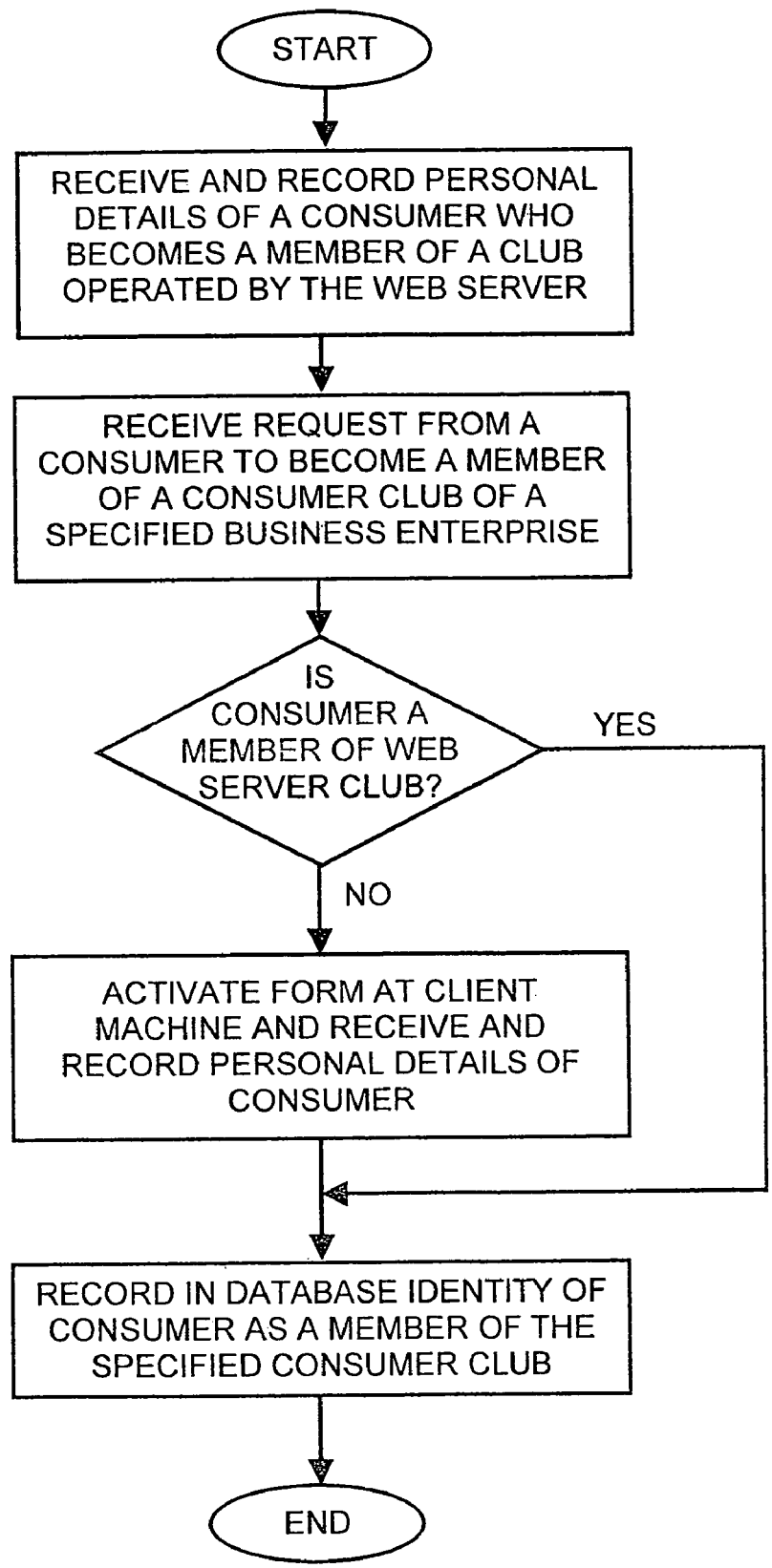
FIG. 16 is a flow diagram showing the principal steps carried out by a web server for recording a consumer as a member of a consumer club associated with a subscribing business enterprise.

FIG. 16 is a flow diagram that summarizes the principal steps carried out by the web server for recording a consumer as a member of a consumer club operated by the web server on behalf of a business enterprise having an entry in the commercial subscriber database. The web server operates such consumer clubs in a manner that preserves the anonymity of the consumers themselves in respect of the commercial subscribers without imposing an overhead on the commercial subscribers themselves. To this end, a user who wishes to have the option to become a member of one or more consumer clubs activates an entry form (not shown) for entering personal details, allowing the web server to establish a user profile for the user. When data commercial relating to selected a business enterprise type is displayed, the user can select one of the displayed business names or icons for joining a consumer club thereof. For example, the user can click on a displayed business name or icon with the right mouse button to present a list of options such as shown pictorially in FIG. 18. One of the displayed items is shown as "Join Customer's Club" and selecting this item allows the web server to flag the consumer as a member of the consumer club of the selected business enterprise. The business enterprise itself is not aware of the fact that a specific consumer has joined its club, whose anonymity is thus completely preserved, and performs no club administration on behalf of the user. Periodically, the business enterprise may request information from the web server and may receive therefrom selected statistics of the consumers, such as age, interests, income bracket and so on: all without compromising the member's anonymity.

If a user who wishes to join a specific consumer club is not a member of the web server club, then clicking on the menu option "Join Customer's Club" causes display of an initial data capture form that allows the web server to capture the user's personal data, whereupon the database is updated to reflect the consumer's personal data and the identity of the consumer club of which he or she is now a member. Such an approach thus requires the consumer to enter his or her personal data once only when joining the web server club. It will also be seen from FIG. 18 that clicking on a displayed business item allows communication to be effected directed between the consumer, at his or her initiative, and the selected business enterprise.

Figure 17:
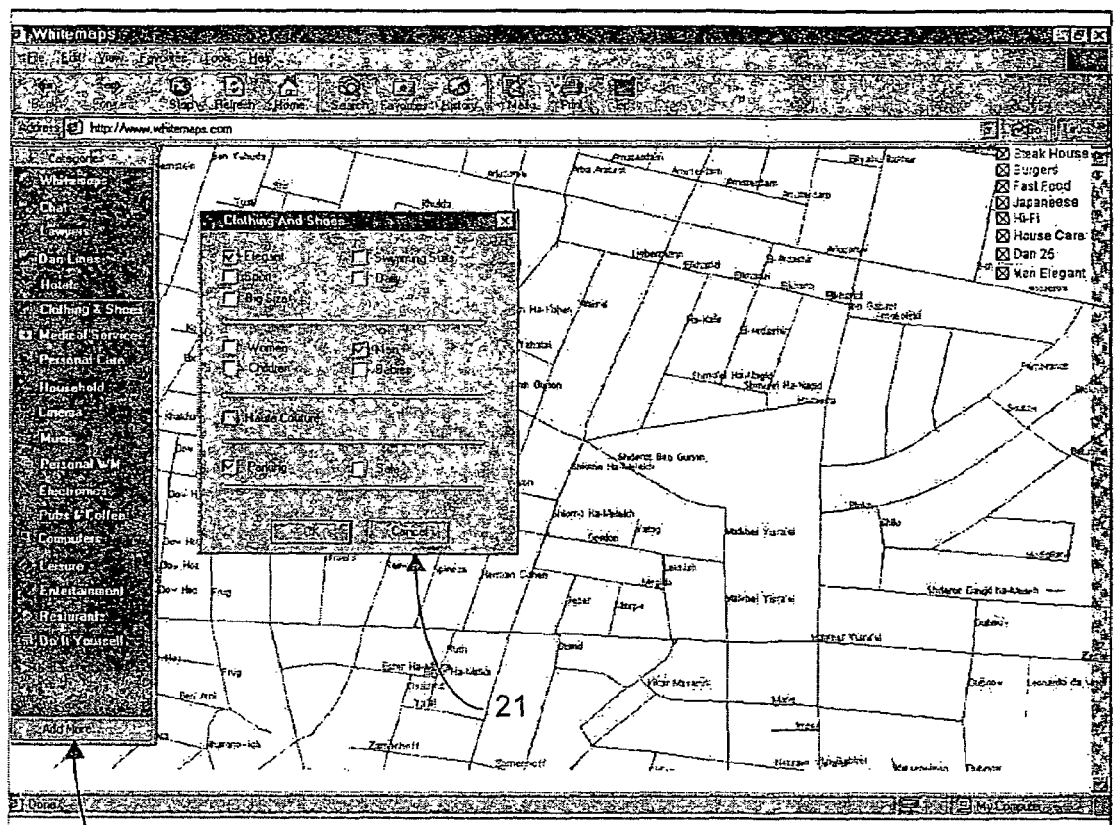
FIG. 17 to 19 are pictorial representations showing details of the operation of the "yellow pages" database displayed in association with location data.

FIG. 17 shows pictorially data shown on a client machine when displaying business data according to the method described above with reference to FIGS. 13 and 14 of the drawings. In this case, business data answering predetermined search criteria are shown displayed, against a map, so as to indicate the location of the displayed business enterprises. The search criteria, in this case, can be a specified catchment area, in which case all business enterprises in the selected catchment are displayed. Also displayed is a toolbar 21 allowing selection of a specific type of business enterprise whose data is to be displayed. Clicking on an item in the toolbar 20 causes display of an entry form 21 specifying required characteristics of the selected commercial enterprise type. The entry form 21 is customized to the selected business type. For example, if the selected business type is "restaurants", the entry form 21 may prompt for price range, type of cuisine, e.g. Italian, Chinese and so on.

Figure 18:
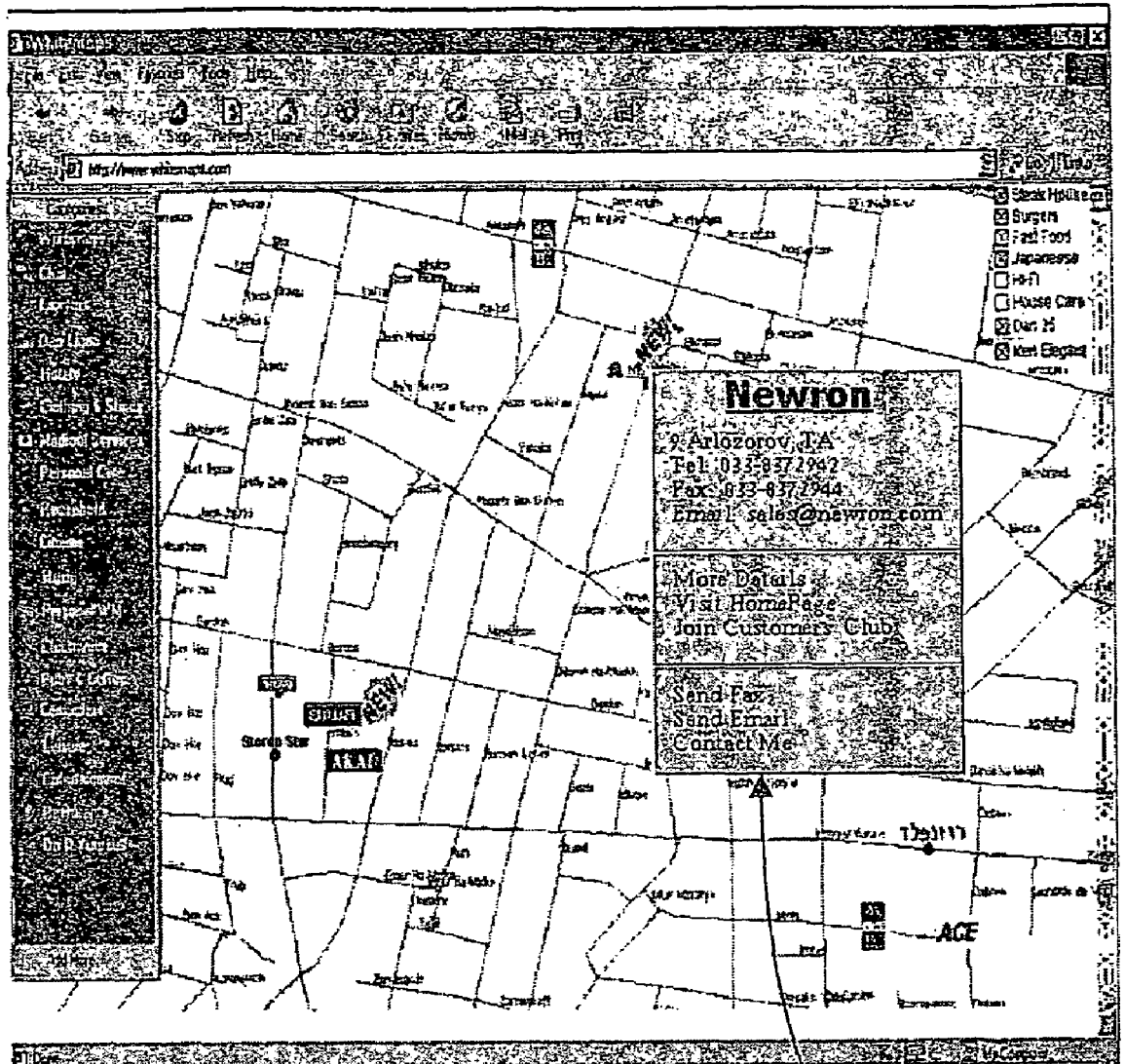
Figure 19:
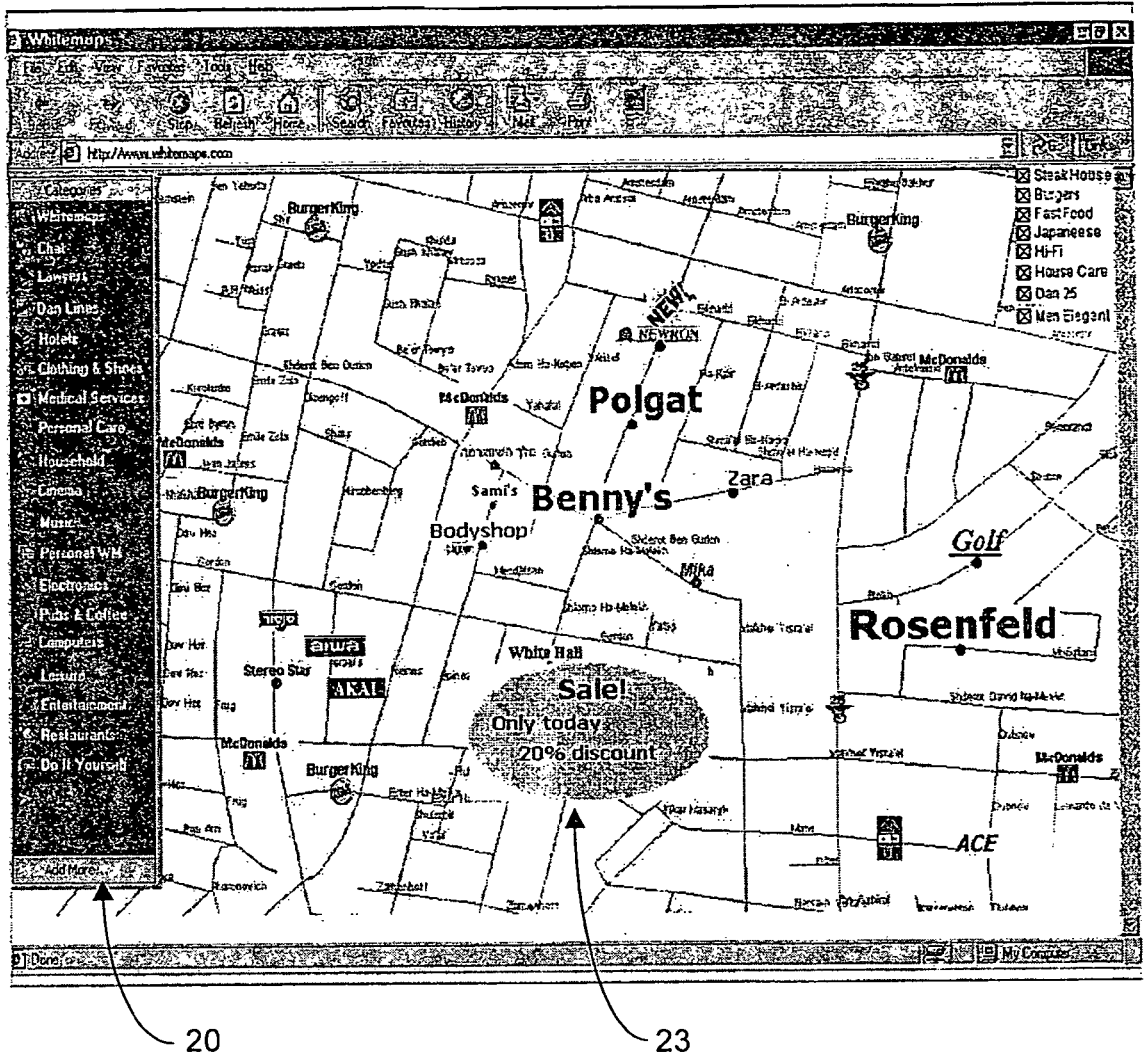

Upon clicking selected options in the entry form 21 and clicking "OK", a subset of data is extracted from the database for display on the client machine as shown in FIGS. 18 and 19.

FIG. 19 shows displayed data corresponding to a specified catchment area in which special offers that may be of interest to the client are displayed in the form of a bubble 23.

The invention thus allows bidirectional communication between a consumer (i.e. client) and a business enterprise. The business enterprise can download general advertising data to all consumers, while the consumer can elect to join a consumer club associated with a specific business enterprise and thereafter enjoy special offers targeted to members of the consumer club only, according to a target user profile. The business enterprise can derive statistics relating to the consumer club, such as growth, membership statistics broken down by age, profession, salary, education and any other criteria finding expression in the user profile.

2. Such an approach provides a general platform for advertisements and may be further extended. For example, the toolbars displayed by the client program may be adapted to carry buttons having captions such as "second hand cars", "apartment rental" etc. The results of a query are shown as entities that can be contacted directly using email, chat, video etc, from within the site. For instance, if the user looks for apartments for rent, the results may be displayed on the map according to the location of the apartments that were found in the database. Alternatively, the results may be displayed independent of the map data. Likewise, the database may be customized for a specific application that does not require the display of map data and so includes only the subscriber's advertisement data. In the general case, as described, it will further be appreciate that the subscribers may be private individuals using the system to sell personal goods. However, their use of the system is still subject to payment to the service provider and so, in this sense, they remain "commercial subscribers".

3. The invention may be directed to platforms other than computers. For example, the invention may be implemented in microchips like the Smart Cards (used in many systems even found on credit cards), SIMM Cards found in cellular phones or PDAs. The fact that the Map client application can be implemented in Java into a small Java-class-file, enables the connection between the invention and microchips (mostly Java-based microchips). Based on the fact that the Map client application occupies less than 5 KB and the current minimum available storage size in such cards is 32 KB, the installation of this client is practical, and can be done without great difficulty. In this way, the small client application can be executed directly on the target machine. For example, many GSM mobiles contain a Java-based SIMM card in which the Map client application can be installed and executed. In this case the mobile's screen can be used by the client application for displaying the desired map (instead the monitor at home).

4. The invention may also be implemented as platform for visual location-dependent control centers. Such an approach can be used by organizations that need to visualize the location of their distributed elements, either for stationary elements (like warehouses, customers, etc.) or for non-stationary elements (like buses, delivery trucks etc). Stationary elements can be loaded into to the control center manually, so as thus to appear on the map. The non-stationary elements should report their location to the control center at specific time intervals, and immediately appear on the map in the last updated location. A possible method that can be practically used by the non-stationary elements is the use of the mobile telephone as a location tracer. This technology is currently available and is used by companies that need to trace the location of mobile telephones for any reason. Such a method is relevant for organizations like public transportation center, deliveries, organizations and so on. For instance, buses in a specified geographic region may be equipped with built-in mobile telephones facilitating effective location tracking of the buses. Location-dependent control centers can then be established at which a user can see exactly where a desired bus is, and thus make a good prediction of when the next bus will arrive. It also gives the public transportation center visual feedback of the location of all its vehicles in the area.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

It will be apparent to those skilled in the art that modifications can be made to the implementation of the invention without departing from its scope as defined in the claims. Thus, for example, whilst in the preferred embodiment, the map data is compressed before downloading to the client machine, it is envisaged that this may not be necessary if a very high bandwidth communications channel were available. Likewise, the data compression might be omitted if the client were willing to wait a sufficiently long time for the complete map data to be downloaded in order to enjoy the benefit offered by the invention in terms of almost immediate post-processing.

Other modifications will likewise be apparent to those skilled in the art. For example, data may be selected from the web server database relating to businesses that send personal to the customer's premises. In such case, the location of the business may not be relevant to the customer and the agent in the client machine may suppress any map data so as not to be displayed. Also, since preferably information is conveyed from the web server to the client machine in layers, once sufficient layers are downloaded by the client machine, continued connection to the web server is no longer necessary. Thus, except from those situations where real-time updating of data is required and display of dynamic information such as special offers and the like, the client machine may be disconnected from the web server after downloading the necessary features of the database.In the method claims that follow, alphabetic characters used to designate claim steps are provided for convenience only and do not imply any particular order of performing the steps.

The invention claimed is:

1. A computer system comprising a processor and a computer-readable storage device storing a computer program that, if executed, causes the computer system to perform operations comprising:
    storing geographical map data and data pertaining to commercial enterprises, said geographical map data representative of at least one map image of a geographic area;
    receiving from a user client a search request pertaining to at least one of the commercial enterprises; and
    providing said user client with a search result responsive to said search request, the search result comprising a subset of said data pertaining to the commercial enterprises and said geographical map data, wherein
        the subset of geographical map data is optimized into one or more minimal-sorted groups and compressed into data packets, the data packets comprising information for restoring said subset of geographical map data,
        said search result sufficient to enable said user client to instantiate an image including one or more representations based on said subset superimposed over a map image of a geographic area represented by said geographical map data and render navigable areas within said geographical area without requiring new map data to be provided to the user client, wherein
        a level of visibility of each enterprise representation in said image is determined according to at least one selection criterion.

2. The computer system of claim 1, wherein a subset of said geographical map data is provided by said server along with said data pertaining to a plurality of commercial enterprises.

3. The computer system of claim 1, wherein said subset includes information for superimposing each of said representations over said geographical map data.

4. The computer system of claim 1, wherein said subset includes businesses related content.

5. The computer system of claim 1, wherein said at least one selection criterion forms a part of a user-specific profile.

6. The computer system of claim 5, wherein said user-specific profile is generated by said server according to information provided from said user client.

7. The computer system of claim 1, wherein said image further displays commercial at enterprise-related information for each of said representations.

8. The computer system of claim 7, wherein said commercial enterprise-related information is provided to said user client by said server as various layers of in formation.

9. The computer system of claim 8, wherein said commercial enterprise-related information is updated dynamically by said server.

10. The computer system of claim 1, wherein said server is further capable of providing said user with information relating to a group of commercial enterprises.

11. The computer system of claim 1, wherein said server is also capable of managing an affiliation of said user to consumer clubs associated with at least one of said commercial enterprises.

12. The computer system of claim 1, further comprising periodically receiving from at least one of said commercial enterprises information relating thereto.

13. The computer system of claim 1, wherein said selection criterion includes relevancy of the one or more representations.

14. The computer system of claim 1, wherein said level of visibility is a function of at least one of a graphical display size, color or animation of each of the one or more representations.

15. The computer system of claim 1, wherein said server is capable of enabling bidirectional communication between said user client and at least one of said commercial enterprises.

16. The computer system of claim 1, wherein said at least one selection criterion is a subscription fee paid by at least one of said commercial enterprises.

17. The computer system of claim 1, wherein said subset includes advertised content.

18. The computer system of claim 1, wherein said level of visibility is a function of a color of each of said data pertaining to commercial enterprises.

19. The computer system of claim 1, wherein said level of visibility is a function of an animation of each of said data pertaining to commercial enterprises.

20. The computer system of claim 1, wherein said at least one selection criterion is geographical location.

21. The computer system of claim 1, wherein each of said representations is positioned in said image according to its respective location on said map image.

22. In a system comprising a processor and memory, a computerized geographic-mapping method comprising:
    storing in said memory geographical map data with data pertaining to commercial enterprises located at geographical locations represented by said geographical map data, said geographical map data representative of at least one map image of a geographic area;

receiving by said system a search result responsive to a search request for at least one commercial enterprise category, the search result comprising a subset of said data pertaining to commercial enterprises and said geographical map data, wherein the subset of geographical map data is optimized into one or more minimal-sorted groups and compressed into data packets, the data packets comprising information for restoring said subset of geographical map data; and in response thereto, automatically transmitting to a remote client machine indicia of enterprise locations included in the search result, said indicia sufficient to enable a display device at the remote client machine to display graphical indicators of said subset superimposed on a geographical map and render navigable areas within said geographical area without requiring new map data to be transmitted to the remote client machine, the locations of the graphical indicators being within a geographic area defined by said geographical map data.

23. The method according to claim 22 wherein each of said graphical indicators is shown at one of a plurality of levels of visibility.

24. A computer system comprising a server and a computer-readable storage device storing a computer program that, if executed, causes the computer system to perform operations comprising:
storing data pertaining to commercial enterprises;
maintaining a database of layers of geographical map data, said map data representative of at least one map image of said geographic area, each layer providing progressively more detail when displayed at a client display;
receiving a search request pertaining to at least one of the commercial enterprises;
providing data a search result responsive to said search request, the search result comprising a subset of said data pertaining to commercial enterprises and said geographical map data, wherein
the subset of geographical map data is optimized into one or more minimal-sorted groups and compressed into data packets, the data packets comprising information for restoring said subset of geographical map data,
said search result sufficient to enable the client display to instantiate an image including one or more representations based on said subset superimposed over a map image of a geographic area represented by said geographical map data and allow a user to navigate within said geographic area without requiring new map data to be downloaded from the map server, wherein
a level of visibility of each enterprise representation is determined according to at least one selection criterion.

25. The system of claim 24, wherein said layers of geographical map data comprises minimized vector format data.

26. The system of claim 25, wherein said minimized vector format data comprises minimal sorted groups, each of said minimal sorted groups comprising a map object and an object type.

27. The system of claim 24, wherein said map data comprises descriptive information in text format.

28. The system of claim 24, wherein said layers of geographical map data comprise groupings of map objects.

29. A computer device comprising a processor and a computer-readable storage device storing a computer program that, if executed, causes the computer device to perform operations comprising:

sending to a map server a request for map data, said map data representative of at least one map image of a geographic area and comprising at least two layers, each layer providing progressively more detail to be displayed at the computer device;
sending to the map server a search request pertaining to at least one of the commercial enterprises;
receiving a search result responsive to said search request, the search result comprising a subset of said data pertaining to the commercial enterprises and said geographical map data, wherein
the subset of geographical map data is optimized into one or more minimal-sorted groups and compressed into data packets, the data packets comprising information for restoring said subset of geographical map data,
said search result sufficient to enable said computer device to instantiate an image including one or more representations based on said subset superimposed over a map image of a geographic area represented by said geographical map data and allow a user to navigate within said geographic area without requiring new map data to be downloaded from the map server, wherein
a level of visibility of each commercial enterprise of said data pertaining to commercial enterprises in said image is determined according to at least one selection criterion; and
displaying at least part of said image on a user interface of the computer device.

30. The device of claim 29, further comprising receiving navigation commands and responding thereto by displaying different parts of the map image without downloading new map data from the map server.

31. A method for downloading map data from a map server to a computer device, the method comprising:
sending from the computer device to a map server a request for map data, said map data representative of at least one map image of a geographic area and comprising at least two layers, each layer providing progressively more detail to be displayed at the computer device;
sending from the computer device to the map server a search request pertaining to at least one of the commercial enterprises;
receiving at the computer device a search result responsive to said search request, the search result comprising a subset of said data pertaining to the commercial enterprises and said geographical map data wherein
the subset of geographical map data is optimized into one or more minimal-sorted groups and compressed into data packets, the data packets comprising information for restoring said subset of geographical map data,
said search result sufficient to enable said computer device to instantiate an image including one or more representations based on said subset superimposed over a map image of a geographic area represented by said geographical map data and allow a user to navigate within said geographic area without requiring new map data to be downloaded from the map server, wherein
a level of visibility of each commercial enterprise of said data pertaining to commercial enterprises in said image is determined according to at least one selection criterion; and
displaying at least part of said image on a user interface of the computer device.

32. The method of claim 31, further comprising receiving navigation commands and responding thereto by displaying different parts of the map image without downloading new map data from the map server.

33. A tangible computer readable medium having stored thereon computer executable instructions that, if executed by a system, cause the machine to perform a system comprising:

storing geographical map data and data pertaining to commercial enterprises, said geographical map data representative of at least one map image of a geographic area;

receiving from a user client a search request pertaining to at least one of the commercial enterprises; and providing said user client with a search result responsive to said search request, the search result comprising a subset of said data pertaining to the commercial enterprises and said geographical map data, wherein the subset of geographical map data is optimized into one or more minimal-sorted groups and compressed into data packets, the data packets comprising information for restoring said subset of geographical map data, said search result sufficient to enable said user client to instantiate an image including one or more representations based on said subset superimposed over a map image of a geographic area represented by said geographical map data and render navigable areas within said geographical area without requiring new map data to be provided to the user client, wherein a level of visibility of each enterprise representation in said image is determined according to at least one selection criterion.

34. A system for providing information related to commercial enterprises, comprising:

means for storing geographical map data and data pertaining to commercial enterprises, said geographical map data representative of at least one map image of a geographic area;

means for receiving from a user client a search request pertaining to at least one of the commercial enterprises; and means for providing said user client with a search result responsive to said search request, the search result comprising a subset of said data pertaining to the commercial enterprises and said geographical map data, wherein the subset of geographical map data is optimized into one or more minimal-sorted groups and compressed into data packets, the data packets Comprising information for restoring said subset of geographical map data, said search result sufficient to enable said user client to instantiate an image including one or more representations based on said subset superimposed over a map image of a geographic area represented by said geographical map data and render navigable areas within said geographical area without requiring new map data to be provided to the user client, wherein a level of visibility of each enterprise representation in said image is determined according to at least one selection criterion.

* * * * *

UNITED STATES PATENT AND TRADEMARK OFFICE
CERTIFICATE OF CORRECTION

PATENT NO. : 7,702,652 B2
APPLICATION NO. : 10/734159
DATED : April 20, 2010
INVENTOR(S) : Ilan Twig and Amit Arad It is certified that error appears in the above-identified patent and that said Letters Patent is hereby corrected as shown below:

Please insert the following on the cover page of the issued patent:

-- (30) Foreign Application Priority Data

May 18, 2000 (IL)..........136233 --

Signed and Sealed this
Twenty-fifth Day of January, 2011

David J. Kappos
*Director of the United States Patent and Trademark Office*